United States Patent
Gelabert et al.

(10) Patent No.: US 10,771,210 B2
(45) Date of Patent: Sep. 8, 2020

(54) METHODS AND NODES IN A WIRELESS COMMUNICATION NETWORK

(71) Applicant: Huawei Technologies Co., Ltd., Shenzhen (CN)

(72) Inventors: Xavier Gelabert, Kista (SE); Petteri Kela, Helsinki (FI); George Koudouridis, Kista (SE); Johan Christer Qvarfordt, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 258 days.

(21) Appl. No.: 15/784,970

(22) Filed: Oct. 16, 2017

(65) Prior Publication Data

US 2018/0054288 A1 Feb. 22, 2018

Related U.S. Application Data

(63) Continuation of application No. PCT/EP2015/062808, filed on Jun. 9, 2015.

(51) Int. Cl.
*H04L 5/00* (2006.01)
*H04W 72/04* (2009.01)
*H04W 48/12* (2009.01)

(52) U.S. Cl.
CPC ......... *H04L 5/0048* (2013.01); *H04W 72/04* (2013.01); *H04L 5/0053* (2013.01); *H04W 48/12* (2013.01)

(58) Field of Classification Search
CPC ............. H04L 5/0048; H04L 5/0053; H04W 72/04–042; H04W 72/1284–1289; H04W 48/12; H04W 24/04; H04W 24/10
See application file for complete search history.

(56) References Cited

U.S. PATENT DOCUMENTS

| | | | | |
|---|---|---|---|---|
| 2008/0057969 | A1* | 3/2008 | Agami | H04L 1/0026 455/450 |
| 2013/0070725 | A1 | 3/2013 | Wang et al. | |
| 2013/0229989 | A1 | 9/2013 | Natarajan et al. | |
| 2014/0064213 | A1 | 3/2014 | Guo et al. | |
| 2016/0095009 | A1* | 3/2016 | Ling | H04W 16/14 370/329 |

FOREIGN PATENT DOCUMENTS

| | | |
|---|---|---|
| CN | 102281642 A | 12/2011 |
| CN | 103024915 A | 4/2013 |
| CN | 104160772 A | 11/2014 |
| EP | 2568729 A1 | 3/2013 |
| EP | 2795983 B1 | 4/2019 |

* cited by examiner

*Primary Examiner* — Eric Myers
(74) *Attorney, Agent, or Firm* — Leydig, Voit & Mayer, Ltd.

(57) ABSTRACT

An Access Node (ANd), for allocating a beacon resource pattern to a User Node (UNd), is configured to: detect the UNd by receiving an uplink beacon signal from the UNd; allocate a beacon resource pattern from a predetermined set of beacon resource patterns to the detected UNd; and signal information about the allocated beacon resource pattern to the UNd.

18 Claims, 17 Drawing Sheets

| UNdID | basePatternID | timeOffset | $T_H, T_L, \eta_H, \eta_L$ |

Fig. 8

| UNdID | basePatternID | timeValid |

Fig. 12

METHODS AND NODES IN A WIRELESS COMMUNICATION NETWORK

CROSS-REFERENCE TO RELATED APPLICATIONS

This application is a continuation of International Application No. PCT/EP2015/062808, filed on Jun. 9, 2015, the disclosure of which is hereby incorporated by reference in its entirety.

TECHNICAL FIELD

Implementations described herein generally relate to an access node (ANd), a method in the ANd, a user node (UNd) and a method therein. In particular is herein described a mechanism for allocating a beacon resource pattern to a UNd, which is transmitting uplink beacon signals.

BACKGROUND

It is expected that network densification will play a major role in beyond 4th generation (4G) networks in order to handle the increasing data traffic demands. In this dense scenario, the measurement of downlink reference signals by the user node (UNd) from a multiplicity of access nodes (ANds) and the transmission of measurement reports back to the network side has been identified in the literature as a suboptimal solution. Some of the reasons are high power consumption having to measure a large number of ANds (due to high expected ANd density) and high signalling load sending back these measurements to the network. In addition, expected smaller cell ranges would impose very stringent requirements on when measuring report feedback should be sent back before they become obsolete. This is particularly true for radio access mobility or ANd (re) selection where measurements are required on a timely manner. Therefore, it is proposed that the UNds transmit uplink (UL) reference signals (henceforth uplink beacons) which are then measured at the network side, possibly by more than one ANd. Reception at multiple ANds is possible provided ANds have common information on the allocated resources for such transmissions, or ANds are able to detect UNd transmissions cross-correlating with known signature sequences transmitted by the UNd. An additional benefit of transmitting uplink beacons is that the use of conventional paging for tracking the UNd can be avoided. Paging consumes a significant amount of bandwidth for each event arrival for a UNd and it is not scalable with a large number of mobile users as assumed in Ultra-Dense Networks (UDNs). The absence of paging also reduces the energy consumption at the UNd.

3rd Generation Partnership Project (3GPP) Long Term Evolution (LTE) operation is heavily based on the measurement of downlink reference signals by the user equipment (UE) and reporting back those measurements to trigger cell reselection (i.e. handover) if necessary. As for the uplink, LTE implements so-called Sounding Reference Signals (SRS) which are used by the eNB to figure out the channel quality in the uplink and hence have better information on where to allocate resources for a particular user. Allocation and configuration of SRS is signalled to the user equipment from the network side.

If uplink reference signals are to be used for mobility purposes and/or location update purposes, the applicability of SRS in LTE seems limited. Indeed, SRS periodicity transmission in LTE is restricted to the set {2, 5, 10, 20, 40, 80, 160, 320} ms, and any change of the periodicity has to be done via Radio Resource Control (RRC) messages. Managing mobility in dense small cell networks will require more flexibility in allocating uplink beacon resources, especially in cases where UNd density is high. Flexibility both in allowing more periodicities than those allowed by LTE (i.e. higher granularity), and periodicities below those allowed by LTE (i.e. more frequent beacons).

Thus, in order to enable implementation of ultra-dense networks, new solutions are required for making intra control node handover of UNds.

SUMMARY

It is therefore an object to obviate at least some of the above mentioned disadvantages and to improve allocation of a beacon resource pattern to a UNd.

This and other objects are achieved by the features of the appended independent claims. Further implementation forms are apparent from the dependent claims, the description and the figures.

According to a first aspect, an access node (ANd) is provided for allocating a beacon resource pattern to a user node (UNd). The ANd is configured to detect the UNd by receiving an uplink beacon signal from the UNd. Further the ANd is configured to allocate a beacon resource pattern from a predetermined set of beacon resource patterns, to the detected UNd. Furthermore the ANd is configured to signal information about the allocated beacon resource pattern to the UNd.

Thanks to the described aspect, the UNd may determine on its own, the rate of uplink beacons it should transmit. Thus the UNd only transmits uplink beacons on a need basis thus enhancing the overall beacon capacity by allowing more UNds to transmit uplink beacons. In addition, UNd battery consumption may be improved as the UNds only transmit signals when needed.

The resource usage of beacon occasions can be determined based on the actual need, which reduces the number of transmissions compared to a static allocation, which reduces the battery consumption in the battery charged UNd. In addition, this limitation of beacon transmissions benefits the overall beacon capacity for other UNds which share the same beacon resources. In particular, the preferred embodiment of the invention involves no explicit signaling from the UNd to the network, thus reducing the control overhead on the Uplink Control Channel (UCCH).

In a first possible implementation of the ANd according to the first aspect, further configured to allocate the beacon resource pattern with the highest possible beacon rate in the predetermined set of beacon resource patterns, to the detected UNd.

Thereby, by start using the highest possible beacon rate in the predetermined set of beacon resource patterns, it is assured that a UNd moving at high speed is provided a beacon resource pattern with an enough high beacon rate for the ANd being able to receive the uplink beacon signals before the UNd is out of reach.

In a second possible implementation of the ANd according to the first aspect, or the first possible implementation of the ANd according to the first aspect, the ANd is further configured to adjust the allocated beacon resource pattern, based on a signal rate limiting parameter of the received uplink beacon signals. Further the ANd is configured to signal information to the UNd, comprising the adjusted allocated beacon resource pattern.

It is thereby possible to adjust the allocation of the beacon resource pattern and thereby the rate of the uplink beacon signals of the UNd, based on the signal rate limiting parameter, which may comprise e.g. rate, or quality, of the received uplink beacon signals. Thus a mechanism is provided for allowing the UNd to tell the ANd that a more sparse beacon resource pattern would be enough (or the opposite) without any explicit signalling for making a request for another beacon resource pattern. By avoiding having to make any explicit signalling for requesting another beacon resource pattern, signalling power is saved at the UNd, leading to prolonged battery recharge intervals. Further, time is saved.

In a third possible implementation of the ANd according to the first aspect, or any of the earlier described possible implementations thereof, the signal rate limiting parameter comprises at least one of rate, or quality, of the received uplink beacon signals.

Thereby the signal rate limiting parameter is further defined.

In a fourth possible implementation of the ANd according to the first aspect, or any of the earlier described possible implementations thereof, the ANd is further configured to adjust the allocated beacon resource pattern by determine that beacon utilisation of the UNd is lower than a threshold limit. Also, the ANd is configured to adjust the allocated beacon resource pattern by allocating a beacon resource pattern with lower beaconing rate, than the currently allocated beacon resource pattern, to the UNd.

Thus a more sparse beacon resource pattern may be provided to a UNd being stationary (or moving at low speed), and/or situated in an ANd sparse area.

In a fifth possible implementation of the ANd according to the first aspect, or any of the earlier described possible implementations thereof, the ANd is further configured to adjust the allocated beacon resource pattern by determine that beacon utilisation of the UNd exceeds the threshold limit. Further, the ANd is configured to adjust the allocated beacon resource pattern by allocating a beacon resource pattern with higher beaconing rate, than the currently allocated beacon resource pattern, to the UNd.

Thus a more dense beacon resource pattern may be provided to a UNd moving at high speed, or situated in an ANd dense area.

In a sixth possible implementation of the ANd according to the first aspect, or any of the earlier described possible implementations thereof, the ANd is further configured to allocate the beacon resource pattern to the detected UNd during a predetermined validation time. The ANd is in addition configured to signal information comprising at least the predetermined validation time of the allocated beacon resource pattern to the UNd.

Thereby further improvements are enabled, as the allocated beacon resource pattern to the UNd may be re-evaluated at the end of the validation time and being exchanged for another, more appropriate beacon resource pattern.

According to a second aspect, a method is provided in an ANd, configured for allocating a beacon resource pattern to a UNd. The method comprises detecting the UNd by receiving an uplink beacon signal from the UNd. Further the method comprises allocating a beacon resource pattern from a predetermined set of beacon resource patterns, to the detected UNd. Also the method further comprises signalling the allocated beacon resource pattern to the UNd.

In a first possible implementation of the method according to the second aspect, the method is further configured for allocating the beacon resource pattern with the highest beacon rate in the predetermined set of beacon resource patterns, to the detected UNd.

In a second possible implementation of the method according to the second aspect, or the first possible implementation of the second aspect, the method is also configured to adjust the allocated beacon resource pattern, based on a signal rate limiting parameter of the received uplink beacon signals, wherein the signalled beacon resource pattern comprises the adjusted beacon resource pattern.

In a third possible implementation of the method according to the second aspect, or any of the earlier described possible implementations thereof, the signal rate limiting parameter comprises at least one of rate or quality of the received uplink beacon signals.

In a fourth possible implementation of the method according to the second aspect, or any of the earlier described possible implementations thereof, the adjustment further comprises determining that beacon utilisation of the UNd is lower than a threshold limit. The adjustment also comprises adjusting the allocated beacon resource pattern by allocating a beacon resource pattern with lower beaconing rate, than the currently allocated beacon resource pattern, to the UNd.

In a fifth possible implementation of the method according to the second aspect, or any of the earlier described possible implementations thereof, the adjustment further comprises determining that beacon utilisation of the UNd exceeds the threshold limit. In addition the adjustment also comprises adjusting the allocated beacon resource pattern by allocating a beacon resource pattern with higher beaconing rate, than the currently allocated beacon resource pattern, to the UNd.

In a sixth possible implementation of the method according to the second aspect, or any of the earlier described possible implementations thereof, the beacon resource pattern is allocated to the detected UNd during a predetermined validation time. Further, the validation time of the allocated beacon resource pattern is signalled to the UNd.

According to a third aspect, a UNd is provided, configured to transmit at least one uplink beacon signal, to be received by at least one ANd in a communication network, using a beacon resource pattern allocated by the ANd with an uplink beacon signal rate on the allocated beacon resource pattern. The UNd is configured to detect a beacon signal rate limiting parameter. Further the UNd is configured to adjust the uplink beacon signal rate, based on the detected beacon signal rate limiting parameter. The UNd is in addition configured to transmit the uplink beacon signal at the adjusted the uplink beacon signal rate.

Thereby, by transmitting uplink beacons and make signal quality measurements at the ANds, i.e. at the network side, various disadvantages associated with downlink reference signals are avoided. By not having to evaluate downlink reference signals from various ANds, battery power is saved at the UNd. Further, by not having to report the result of any downlink reference signal evaluation to the network, more battery power is saved as well as time.

In a first possible implementation of the UNd according to the third aspect, the beacon signal rate limiting parameter comprises speed of the UNd or density of ANds within a subset of the communication network, within wireless signalling reach of the UNd.

In a second possible implementation of the UNd according to the third aspect, or the first possible implementation thereof, the UNd is further configured to estimate the UNd speed. Further the UNd is configured to adjust the uplink beacon signal rate by decreasing the rate when the estimated UNd speed is lower than a threshold level, or increasing the rate when the estimated UNd speed exceeds the threshold level, within the allocated beacon resource pattern.

By letting the UNd evaluate the speed and adapt the beacon signalling rate to the speed, a beacon rate appropriate to the current UNd speed may be used. Thereby information concerning the speed of the UNd may implicitly be communicated with the ANd, which in turn is enabled to select and allocate another beacon resource pattern for the UNd.

In a third possible implementation of the UNd according to the third aspect, or any of the earlier described possible implementations thereof, the UNd is further configured to estimate the density of ANds within a subset of the communication network. Further the UNd is configured to adjust the uplink beacon signal rate by decreasing the rate when the estimated density of ANds is lower than a threshold level, or increasing the rate when the estimated density of ANds exceeds the threshold level, within the allocated beacon resource pattern.

By letting the UNd evaluate the density of ANds and adapt the beacon signalling rate to the density of ANds, a beacon rate appropriate to the current density of ANds in the current subset of the communication network may be used. Thereby further improvements are achieved.

In a fourth possible implementation of the UNd according to the third aspect, or any of the earlier described possible implementations thereof, the UNd is further configured to detect the beacon signal rate limiting parameter by receiving information thereof from the ANd.

Thus information concerning ANd density, or UNd speed may be received from the ANd, which saves computation efforts at the UNd.

According to a fourth aspect, a method is provided in a UNd. The method is configured to transmit at least one uplink beacon signal, to be received by at least one ANd in a communication network, using a beacon resource pattern allocated by the ANd with an uplink beacon signal rate on the allocated beacon resource pattern. The method comprises detecting a beacon signal rate limiting parameter. Also, the method further comprises adjusting the uplink beacon signal rate, based on the detected beacon signal rate limiting parameter. The method also comprises transmitting the uplink beacon signal at the adjusted the uplink beacon signal rate.

In a first possible implementation of the method according to the fourth aspect, the beacon signal rate limiting parameter comprises speed of the UNd, or density of ANds within a subset of the communication network, within wireless signalling reach of the UNd.

In a second possible implementation of the method according to the fourth aspect, or the first possible implementation thereof, the beacon signal rate limiting parameter is detected by estimating the UNd speed. Further, the uplink beacon signal rate adjustment comprises decreasing the rate when the estimated speed is lower than a threshold level, or increasing the rate when the estimated UNd speed exceeds the threshold level, within the allocated beacon resource pattern.

In a third possible implementation of the method according to the fourth aspect, or any of the earlier described possible implementations thereof, the beacon signal rate limiting parameter is detected by estimating the density of ANds within a subset of the communication network. Further the uplink beacon signal rate adjustment comprises decreasing the rate when the estimated density of ANds is lower than a threshold level, or increasing the rate when the estimated density of ANds exceeds the threshold level, within the allocated beacon resource pattern.

In a fourth possible implementation of the method according to the fourth aspect, or any of the earlier described possible implementations thereof, the beacon signal rate limiting parameter is detected by receiving information thereof from the ANd.

According to a fifth aspect, a computer program with a program code for performing a method according to the second aspect, or any possible implementation thereof, or a method according to the fourth aspect, or any possible implementation thereof when the computer program runs on a computer.

The advantages of the method according to the second aspect, and/or the computer program according to the fifth aspect are the same as those for the corresponding device claims according to the first aspect.

The advantages of the method according to the fourth aspect and/or the computer program according to the fifth aspect are the same as those for the corresponding device claims according to the third aspect.

Other objects, advantages and novel features of the aspects of the invention will become apparent from the following detailed description.

BRIEF DESCRIPTION OF THE DRAWINGS

Various embodiments are described in more detail with reference to attached drawings, illustrating examples of embodiments of the invention in which:

FIG. 8 illustrates a possible format for beacon allocation information sent over DCCH, according to an embodiment of the invention.

FIG. 12 illustrates an example of beacon resource pattern with validation time in an embodiment.

DETAILED DESCRIPTION

Embodiments of the invention described herein include an ANd, a method in the ANd, a UNd and a method in the UNd, which may be put into practice in the embodiments described below. These embodiments may, however, be exemplified and realised in many different forms and are not to be limited to the examples set forth herein; rather, these are illustrative examples of embodiments.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
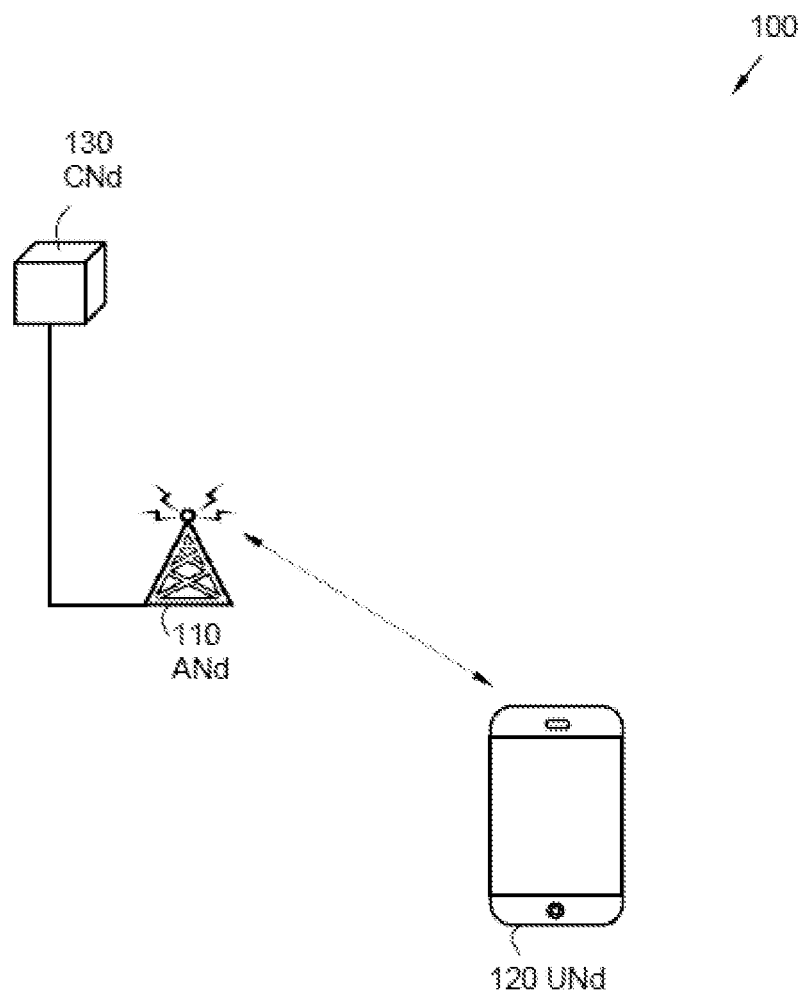
FIG. 1 is a block diagram illustrating a wireless communication network according to an embodiment.

FIG. 1 is a schematic illustration over a wireless communication network 100 comprising an access node (ANd) 110, for communication of signals, data and/or data packets over a wireless interface with a user node (UNd) 120. The ANd 110 is connected via a wired or wireless interface to a control node (CNd) 130.

The ANd 110 may according to some embodiments be configured for wireless downlink transmission and may be referred to, respectively, as e.g., a base station, NodeB, evolved Node Bs (eNB, or eNode B), base transceiver station, Access Point Base Station, base station router, Radio Base Station (RBS), macro base station, micro base station, pico base station, femto base station, Home eNodeB, sensor, beacon device, relay node, repeater or any other network node configured for communication with the UNd 120, over a wireless interface, depending, e.g., of the radio access technology and/or terminology used.

The UNd 120 may correspondingly be represented by, e.g. a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with one or more ANds 110, according to different embodiments and different vocabulary.

The CNd 130 controls the ANd 110 and possibly a plurality of other ANds forming a control region.

It is to be noted that the illustrated network setting of one CNd 130, one ANd 110 and one UNd 120 in FIG. 1 is to be regarded as a non-limiting example of an embodiment only. The wireless communication network 100 may comprise any other number and/or combination of CNds 130, ANds 110 and/or UNds 120 may thus be involved in some embodiments of the disclosed invention.

Thus whenever "one" or "a/an" UNd 120, ANd 110 and/or CNd 130 is referred to in the present context, a plurality of UNds 120, ANds 110 and/or CNds 130 may be involved, according to some embodiments.

It may further be assumed that the UNd 120 transmits uplink (UL) reference signals (henceforth uplink beacons) at either regular intervals (periodically) and/or at particular time instants (aperiodically).

One important issue to solve is to determine how often the UNd 120 should transmit the uplink beacon and how this allocation should be scheduled. The requirements on the beacon frequency will depend on UNd-specific states such as its speed, its location, the network density, distance, UNd-profile and possibly others.

The beacon frequency, i.e. the rate at which UNds transmit beacons is decided autonomously by the UNd 120 yet assisted by the network side. The beacon frequency determination may be based on local parameter estimation of, among others, speed, location, ANd density, etc., as will be mentioned later on, made by the UNd 120.

Thereby a method in an access network is presented to allocate resources for the UNd 120 in the coverage area of the network 100 for uplink beacon transmissions, a method in a UNd 120 to determine how often the assigned beacon occasions are required to be used and a method in an access network to determine based on said beacon occasion usage a new allocation to said UNd 120.

With a minimum of signalling load, the usage of the uplink beacon resources can be made more efficient based on the actual need, reducing the battery consumption of the UNd and the need for dedicated resources for uplink beacon transmissions can be reduced lowering the required signalling overhead in the network.

Thus, in the here described method, the UNd 120 determines its own uplink beacon rate. It is thereby assured that the UNd 120 only transmits uplink beacons on a need basis thus enhancing the overall beacon capacity by allowing more UNds to transmit uplink beacons. In addition, UNd battery consumption can be optimized, i.e. reduced, if the UNd 120 transmit only when needed. Thereby the time between battery recharge is prolonged, leading to enhanced user experience.

Figure 2:
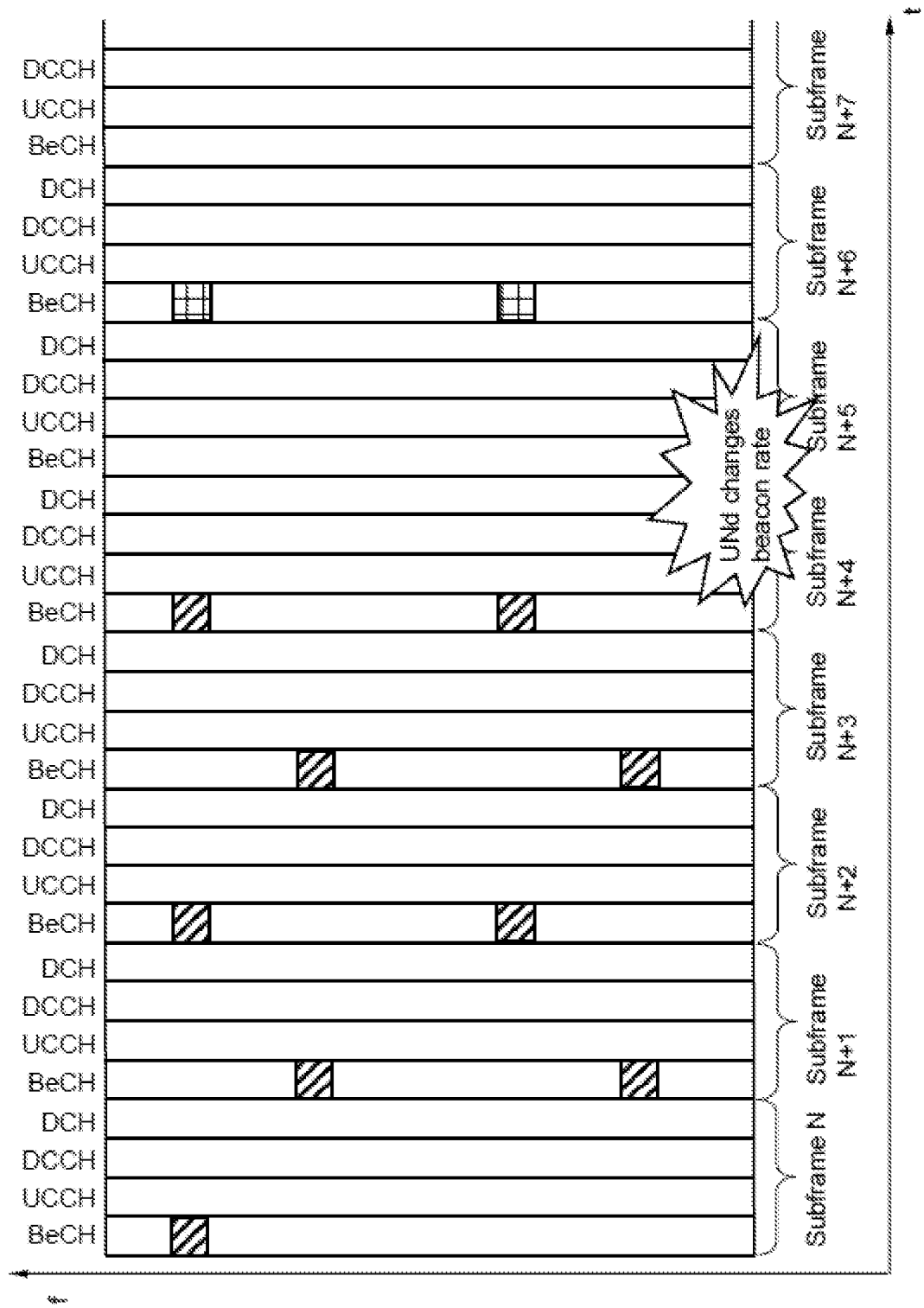
FIG. 2 is a block diagram illustrating a frame structure describing beacon resource pattern allocation and transmission over a Beacon CHannel (BeCH) according to an embodiment.

FIG. 2 illustrates the considered frame structure containing a Beacon Channel (BeCH), followed by an Uplink Control Channel (UCCH), followed by a Downlink Control Channel (DCCH), and followed by a Data Channel (DCH). The frequency axis in FIG. 2 may be expressed in subcarrier number units, or alternatively in Hertz in different embodiments. The time axis may alternatively be expressed in subframe units, each subframe being in turn expressed in symbol units, or alternatively in seconds in different embodiments.

The transmission of a single uplink beacon happens over a time-frequency allocation of one subcarrier and one symbol. For a given UNd 120, multiple uplink beacons can be allocated at the same symbol over different subcarriers, e.g. 2 uplink beacons in the example case of FIG. 2. The purpose for this may be to increase the reliability of receiving the beacon over frequency selective fading radio conditions. In the time domain, beacons are allowed to be transmitted over the BeCH with periodicity $T_{BeCH}=1/f_{BeCH}$ [symbols], where $f_{BeCH}$ denotes the occurrence rate of the BeCH.

The UNd beacon rate, $f_b$ is a measure of how often uplink beacons for the UNd 120 are being transmitted in the time domain over the BeCH. The maximum UNd beacon rate may be given by $f_b=f_{BeCH}$, meaning that the UNd 120 transmits uplink beacons regularly and on each and every subframe over the BeCH. In general, the UNd 120 may transmit beacons once every $N_b T_{BeCH}$ symbols with $N_b \geq 1$, hence with rate $f_b=f_{BeCH}/N_b$. For convenience, the beacon rate may be normalised to $f_{BeCH}$, hence $\bar{f}_b = f_b/f_{BeCH} = 1/N_b$. The set of possible beacon rates is given by the set $\bar{f}_b = \{1, \frac{1}{2}, \frac{1}{3}, \frac{1}{4}, \ldots\}$.

In the example provided in FIG. 2, during the first 4 subframes the beacon rate of the UNd 120 is $f_{b1}$. At a given point in time, illustrated by the starburst, the UNd 120 decides to decrease the beacon rate from $f_{b1}$ to $f_{b2}$. In this particular non-limiting example, the beacon rate has been decreased by half.

Figure 3:
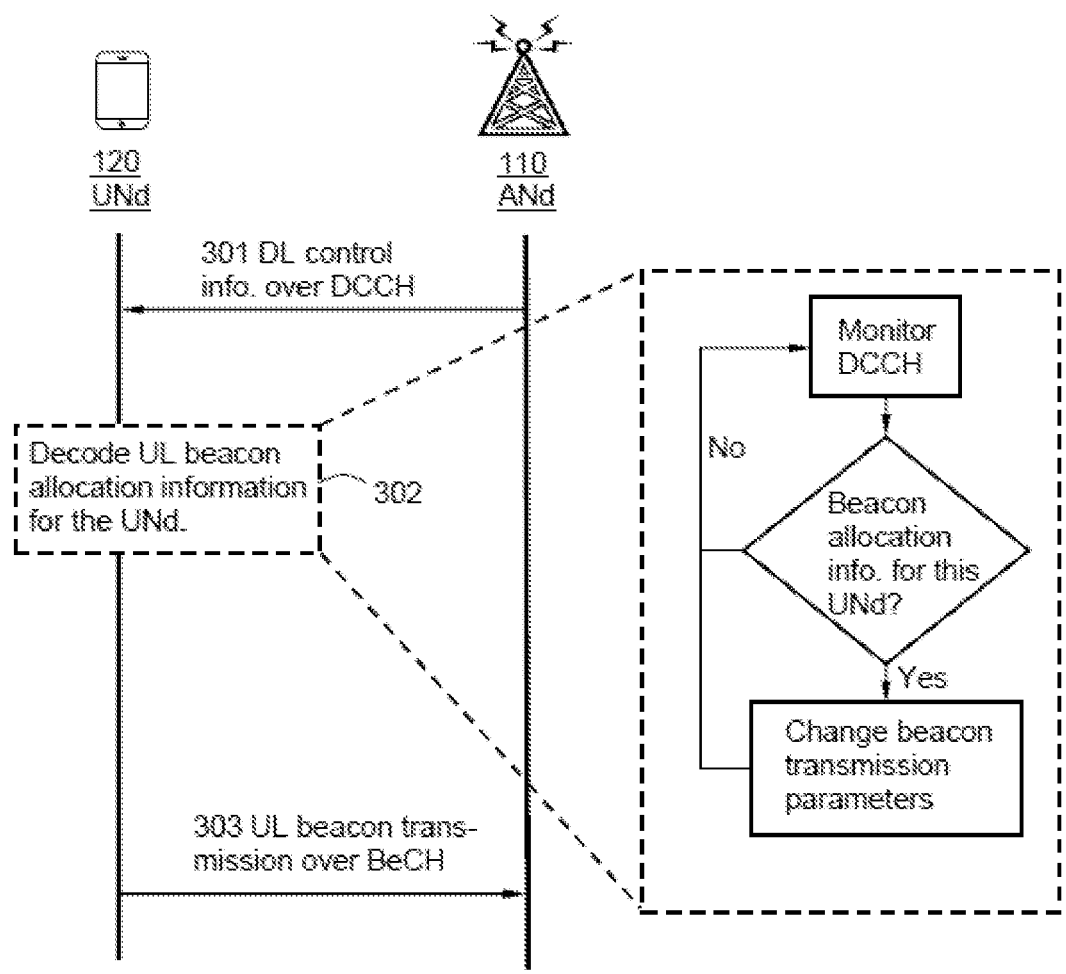
FIG. 3 is a block diagram illustrating a wireless communication according to an embodiment of the invention.

FIG. 3 illustrates a UNd 120 which monitors the DCCH and decodes possible beacon allocation changes. If applicable, it may change beacon transmission parameters before next beacon transmission over the BeCH.

Consider a wireless network 100 with a multiplicity of ANds 110 serving a number of UNds 120. The UNds 120 are configured to periodically monitor a downlink control channel (see the DCCH in FIG. 2) in order to obtain information on the transmission of uplink beacons. FIG. 3 shows a possible message exchange and flowchart for this procedure.

As for the beacon allocation information referred to in FIG. 3, a predefined finite set of N time-frequency base beaconing pattern levels $\{P1, P2, \ldots, PN\}$ may be assumed to be available at the network side.

In a first step 301, the CNd 130 sends downlink (DL) control information over the DCCH via the ANd 110, to be received by the UNd 120.

In a second step 302, the UNd 120 may decode uplink allocation information for the UNd 120, based on the received control information of step 301.

Further, in a further step 303, the UNd 120 transmits uplink beacon signals over the BeCH.

Each base pattern may be designed from a particular combination of frequency resources and time-periodicities. It is assumed that the pattern allocation may follow a N-level tree-like structure as depicted in FIG. 1. Each pattern level i provides a set of different patterns with common time-frequency beaconing periodicity being denoted as Pi(j). Index j represents the particular pattern within the specified level. Thus, a given pattern Pi(j) is determined by the pattern level index i and the pattern offset index j.

Figure 4:
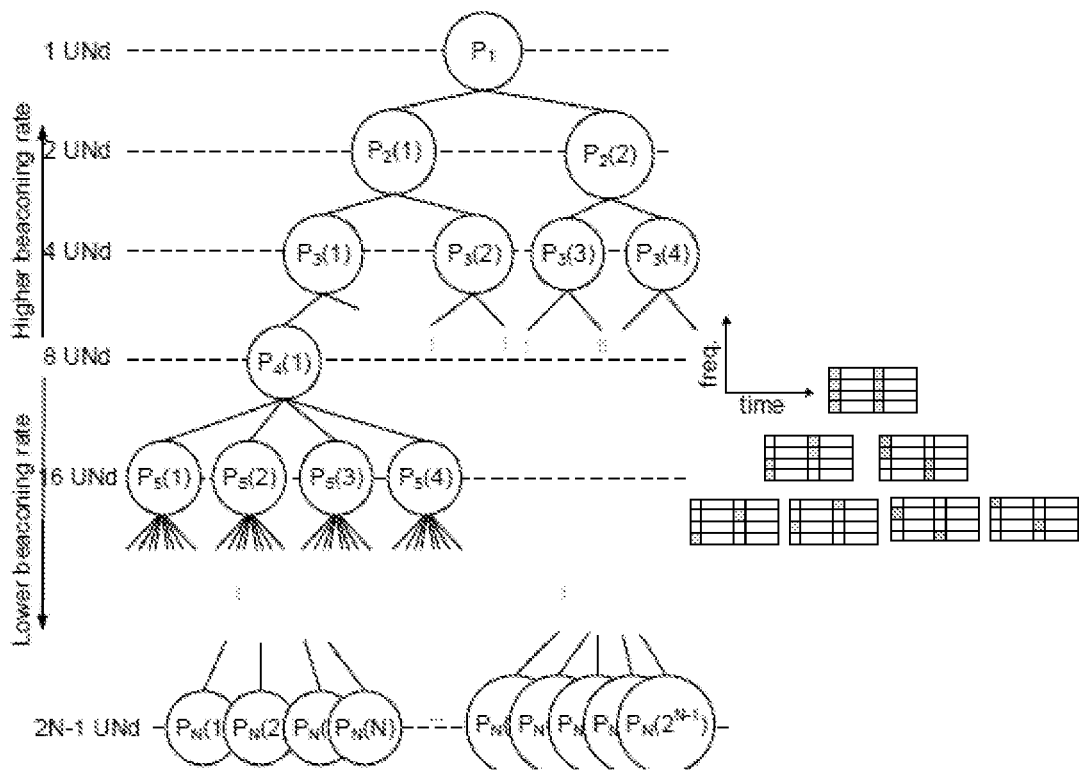
FIG. 4 is a tree-graph describing beacon resource pattern allocation according to an embodiment of the invention.

Pattern allocation according to FIG. 4 would allow, for example, to allocate a pattern $P_2(1)$ to one UNd 120 and two (different) level-3 patterns to two other UNds ($P_3(3)$ and $P_3(4)$ respectively). If another additional UNd would require beaconing, pattern $P_2(1)$ could no longer be assigned. Further down in the pattern allocation tree, i.e. by increasing pattern level, the lower the beaconing rate becomes. Similarly, further down in the pattern allocation tree the higher the number of UNds can be allocated with beacons.

In one embodiment, the same beaconing patterns could be spatially reused by UNds 120 which are known to be far apart (in geographical terms).

Figure 5:
FIG. 5 illustrates a possible format for beacon allocation information sent over the Downlink Control CHannel (DCCH), according to an embodiment of the invention.

The beacon allocation information sent by the CNd 130 via the ANd 110, over the DCCH may comprise an identifier, similar to the Radio Network Temporary Identifier (RNTI) and some bits to determine which base pattern to use as illustrated in FIG. 5. Additionally it may also comprise a time-coordinate (timeOffset) specifying when the UNd 120 should start transmitting with this new base pattern.

The UNd 120 may receive the correspondence between the basePatternID and the specific pattern parameters (basePatternConfiguration list) when the UNd 120 is switched on and receives some common information sent over the DCCH (i.e. similar to Master Information Blocks (MIBs) in Long Term Evolution (LTE)). Once it receives the basePattern Configuration it may request for an initial (or default) pattern by transmitting an initialBasePatternRequest command over the UCCH. Then, following e.g. the procedure described in FIG. 3, it may monitor the DCCH and decode which basePatternID it should use in the beacon transmissions. This procedure is illustrated in FIG. 6.

Figure 6:
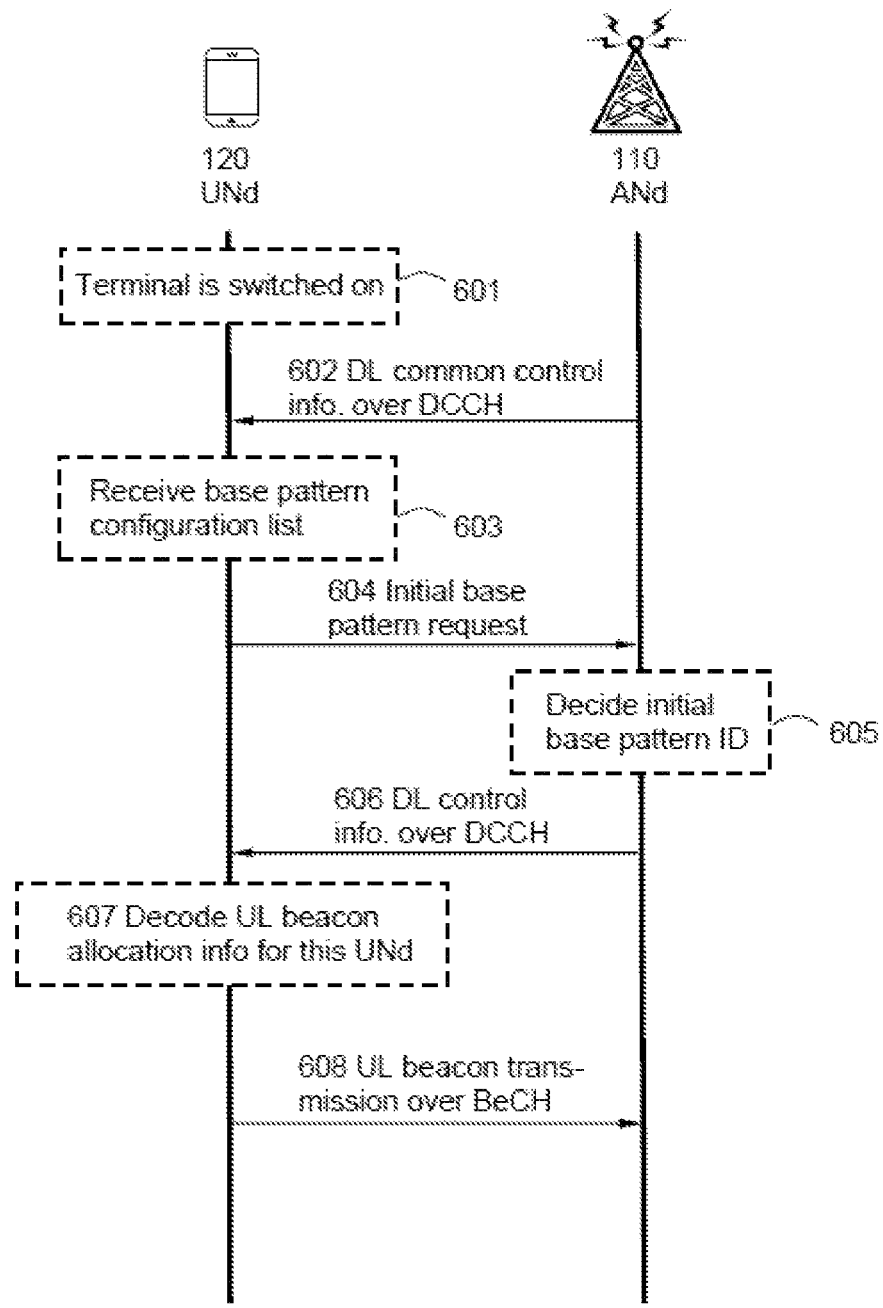
FIG. 6 illustrates a signalling scheme and a possible sequence flow according to an embodiment of the invention.
Figure 7:
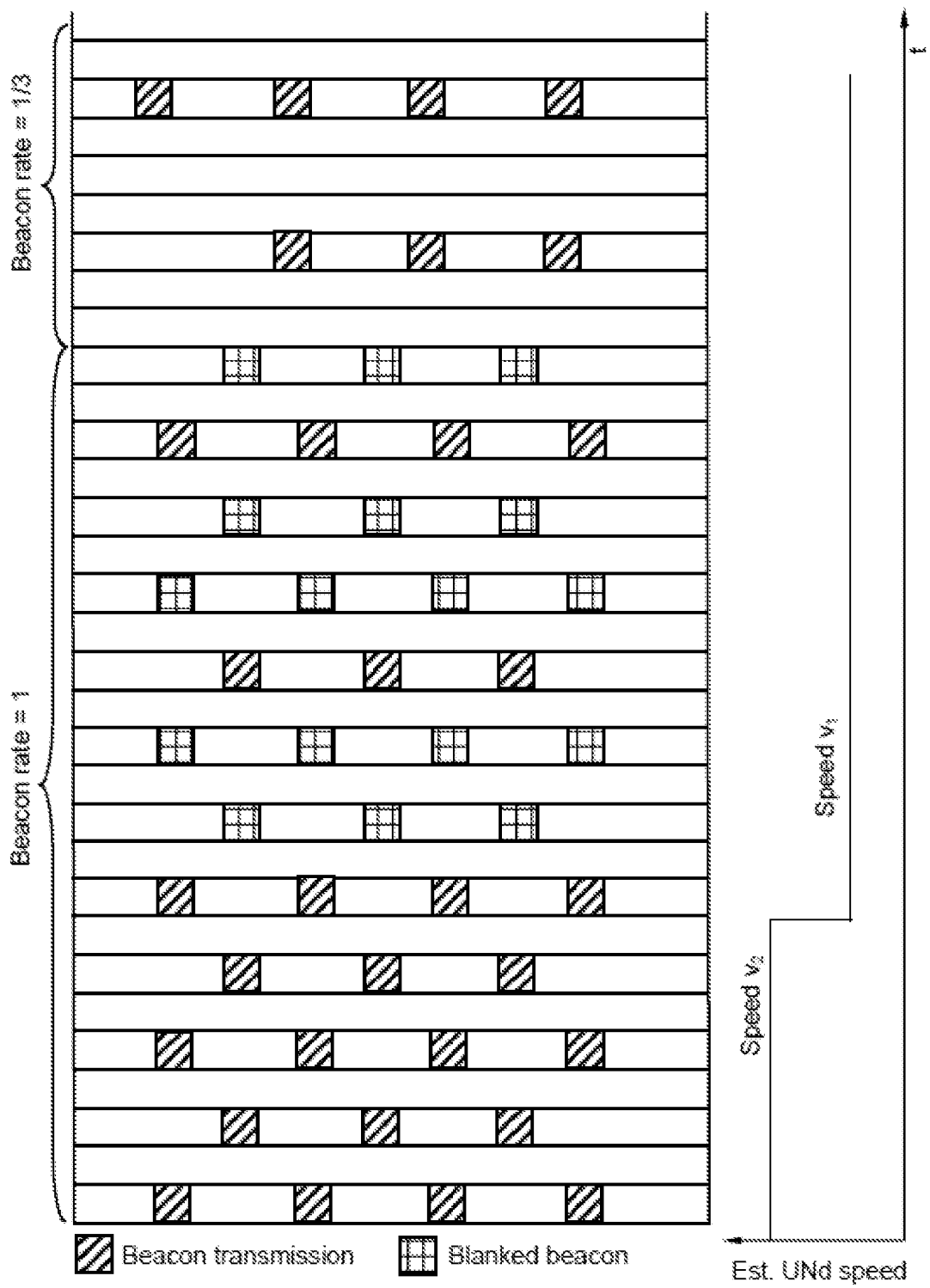
FIG. 7 illustrates decreased UNd beacon rate due to decreased UNd speed, according to an embodiment of the invention.

FIG. 6 illustrates a possible sequence flow for obtaining the basePatternConfiguration list and requesting a default or initial basePatternID.

In a first step 601, the UNd 120 is switched on. In step 602, the CNd 130 sends downlink control information over the DCCH via the ANd 110, to be received by the UNd 120. Thereby, the UNd 120 receives a base pattern configuration list in step 603.

In a further step 604, an initial base pattern request may be sent by the UNd 120. Upon receiving the request in step 605 via the ANd 110, the CNd 130 decide initial base pattern ID for the UNd 120. Further, downlink control information is transmitted over the DCCH via the ANd 110 in step 606. The UNd 120, when receiving the control information, decodes uplink beacon allocation information for this UNd 120 in step 607. Thereafter, the UNd 120 may transmits uplink beacon transmissions over BeCH in step 608.

Based on the above, the CNd 130 may allocate an initial pattern $P_i(j)$ (equivalently a basePatternID), which may not reflect the current beaconing needs of the UNd 120. In addition, sudden changes in UNd mobility may require a change of beaconing pattern. For example, the static UNd 120 may not require transmitting beacons as often as the UNd 120 when moving fast. Thus the beacon rate should reflect radio condition changes. One possibility may be to let the CNd 130 initially assign the lowest possible pattern level (i.e. highest beacon rate), considering already allocated UNds.

Each beacon resource pattern provides the UNd with time-frequency information for the transmission of beacons according to a particular beacon rate $f_{b,M} = 1/M$. Additionally, a beacon resource pattern can be associated to a given signature sequence belonging to some sequence group (e.g. m-sequences or Zadoff-Chu sequences). This may allow more than one UNd 120 to use the same time-frequency beacon resource and still be detected at the ANd 110.

The UNd 120, based on own measurements on speed, location and possibly other parameters, decides whether or not it should transmit over the assigned beacon resource pattern resources or only over a subset of them, thus effectively changing the beacon rate from $f_{b,M} = 1/M$ to $f_{b,N} = 1/N$ with $N > M$.

An advantage therewith, is that by only using the necessary beacon resources, the amount of energy devoted to transmission of beacons is reduced and unutilized beacon resources becomes free, to be used by other UNds. As a consequence, efficient beaconing rates may allow a better implementation of Discontinuous Reception (DRX)/Discontinuous Transmission (DTX) techniques thus allowing improved energy savings.

In one embodiment the UNd 120 may determine its speed by using time-stamped downlink control channel transmissions which can be made available. To this end, the UNd 120 may use the time between and the estimated path-loss values of any two subsequent signals to estimate the distance and subsequently the speed of the UNd 120. An estimation of the UNd velocity may be further enhanced based on knowledge of the UNd direction of movement. Furthermore, the UNd 120 can also determine its speed for example through internal sensors, such as accelerometers, gyros and consecutive position measures (e.g. using radio trilateration or angle of arrival techniques), or an internal Global Positioning System (GPS). In another embodiment, the speed estimation may be performed at the network side, i.e. by the ANd 110 and signalled back to the UNd 120 for it to decide whether the beacon rate may be modified.

Another relevant measure impacting the beacon rate is the density of the ANds 110 in the area. Higher density of ANds 110 in an area may require higher beacon rate, since there are more potential ANd receivers of the uplink beacon transmission and the strongest receiver may change more often. In one embodiment of the invention the UNd 120 may determine the density of ANds 110 in the vicinity based on the received power of downlink signals from the ANds 110, for example assuming that some DCCH resources are allocated to different ANds 110. The expressions "allocated" and "assigned" are synonyms and may herein be used intermittently. In another embodiment of the invention, the information about the ANd density may also be sent to the UNd 120 from the network side, e.g. by the CNd 130 via the ANd 110, or by the ANd 110. In a further embodiment of the invention the density may be determined by the UNd 120 based on Time Difference of Arrival (TDoA) of downlink signals from the ANds 110 in the vicinity.

In some embodiments, no explicit signalling may be made from the UNd 120 to the network to determine whether beacon resources are being fully utilised. Hence, the detection of whether resources are being efficiently utilised may be based on simple low and high beacon utilisation thresholds $\eta_L$ and $\eta_H$, respectively. Beacon utilisation ($\eta$, $0 \leq \eta \leq 1$) may be measured as the ratio between the number of used beacon resources and the number of available resources (provided by the allocated beacon resource pattern) during some predefined time. Note that both the UNd 120 and the network (i.e. the ANd 110 or the CNd 130) may be able to compute this metric; the UNd 120 since it decides on the beacon transmissions and the network by receiving or not such transmissions. If the network detects that the beacon utilisation $\eta$ falls below $\eta_L$ during some predefined time $T_L$, it may indicate that allocated beacon resources are underutilised and thus a new base beacon resource pattern (with lower beaconing rate) may be notified to the UNd 120 through the DCCH. Similarly, if the network detects that the beacon utilisation $\eta$ is over threshold $\eta_H$ during some time $T_H$, it is indicative that beaconing resources are underprovisioned and thus may increase the beacon rate by allocating a new base beacon resource pattern over the DCCH. It may occur that the allocated beacon resource pattern is the desired one and the beacon utilisation is over the threshold $\eta_H$. In this case, to avoid a new pattern allocation with higher beacon rate, the UNd 120 may disrupt the timer controlling $T_H$ by intentionally blanking-out beacon transmissions so that the beacon utilisation $\eta$ falls below $\eta_H$ for a short period of time, enough to reinitialise timer controlling $T_H$. For the above method to work, the values of the thresholds $\eta_H$ (possibly $\eta_L$) and timers $T_L$ and $T_H$ are known by the UNd 120. A possible solution may be that they can be sent jointly along the beacon resource pattern information sent over the DCCH, according to some embodiments; see FIG. 8. Furthermore, if the network detects that $T_H$ disruptions occur following a known pattern, it may choose to increase the timer $T_H$ in some embodiments.

Figure 9:
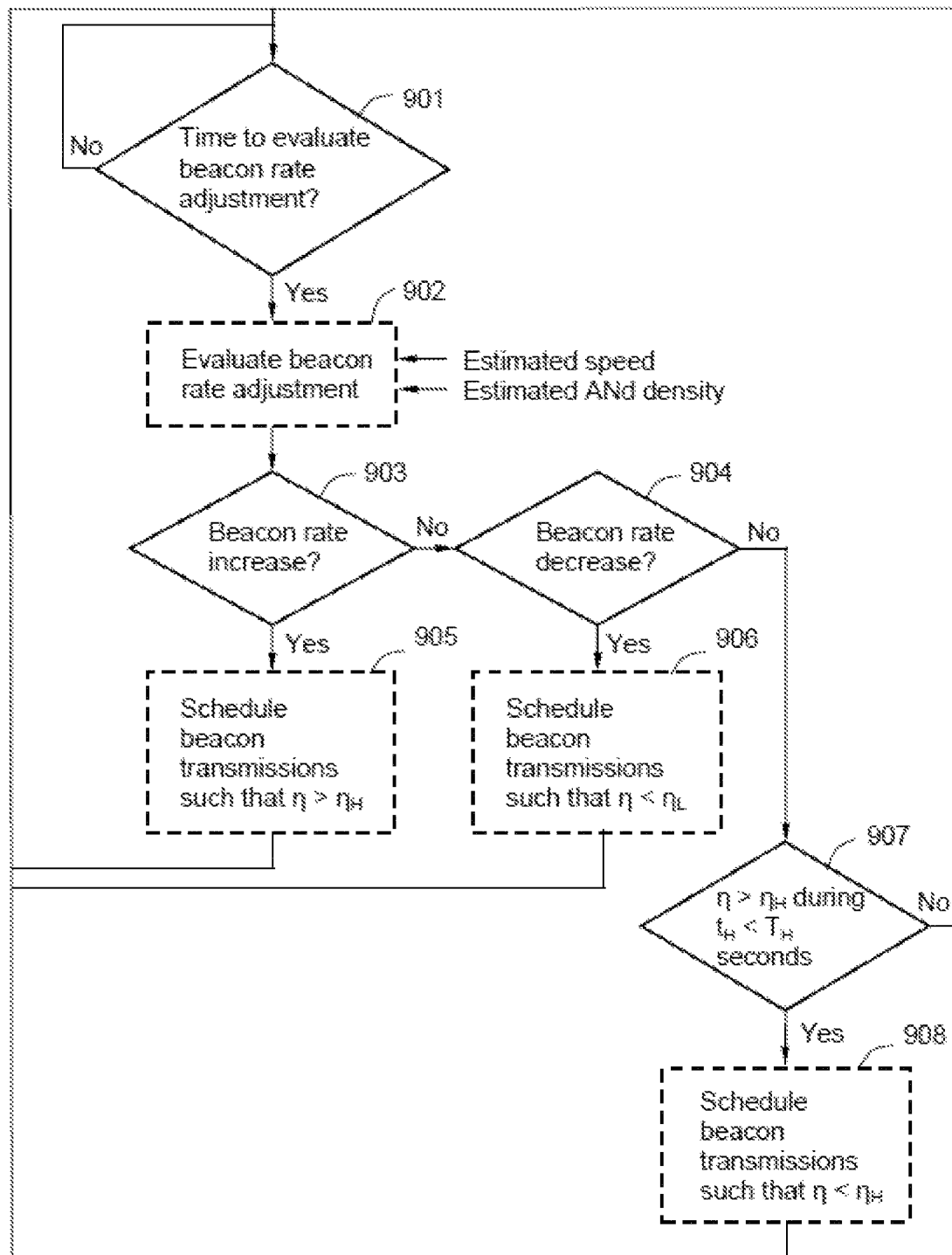
FIG. 9 is a flowchart for UNd determination of beacon rate adjustment, according to an embodiment.

FIG. 9 is a flowchart for UNd determination of beacon rate adjustment (such as e.g. increase, decrease or maintain). In the case of maintaining the beacon rate, care is to be taken of avoiding a rate increase by lowering the beacon utilisation for some short time.

At the UNd side, the flowchart for triggering or not a change in the beacon resource pattern frequency is provided by FIG. 9. In this case there is no explicit signalling from the UNd 120 towards the network to adjust the beacon rate.

In step 901, the UNd 120 determine if it is time to evaluate beacon rate adjustment, e.g. as a timer has timed out, or a validation time for a previously assigned beacon rate has ended.

If it is, the UNd 120 evaluate beacon rate adjustment in step 902, based on estimated speed of the UNd 120 and/or estimated ANd density.

Based thereupon, it may be determined to increase the beacon rate in step 903, or decrease the beacon rate in step 904.

In case it has been determined in step 903 to increase the beacon rate, beacon transmissions are scheduled such that $\eta > \eta_H$, in step 905. In the opposite case, when it has been determined to decrease the beacon rate in step 904, beacon transmissions are scheduled such that $\eta < \eta_L$, in step 906.

In case the beacon rate is neither increased in step 903, nor decreased in step 904, a check may be made if $\eta > \eta_H$ during $\eta_H < T_H$ seconds in step 907. If this is the case, beacon transmissions are scheduled such that $\eta < \eta_H$ in step 908.

Figure 10:
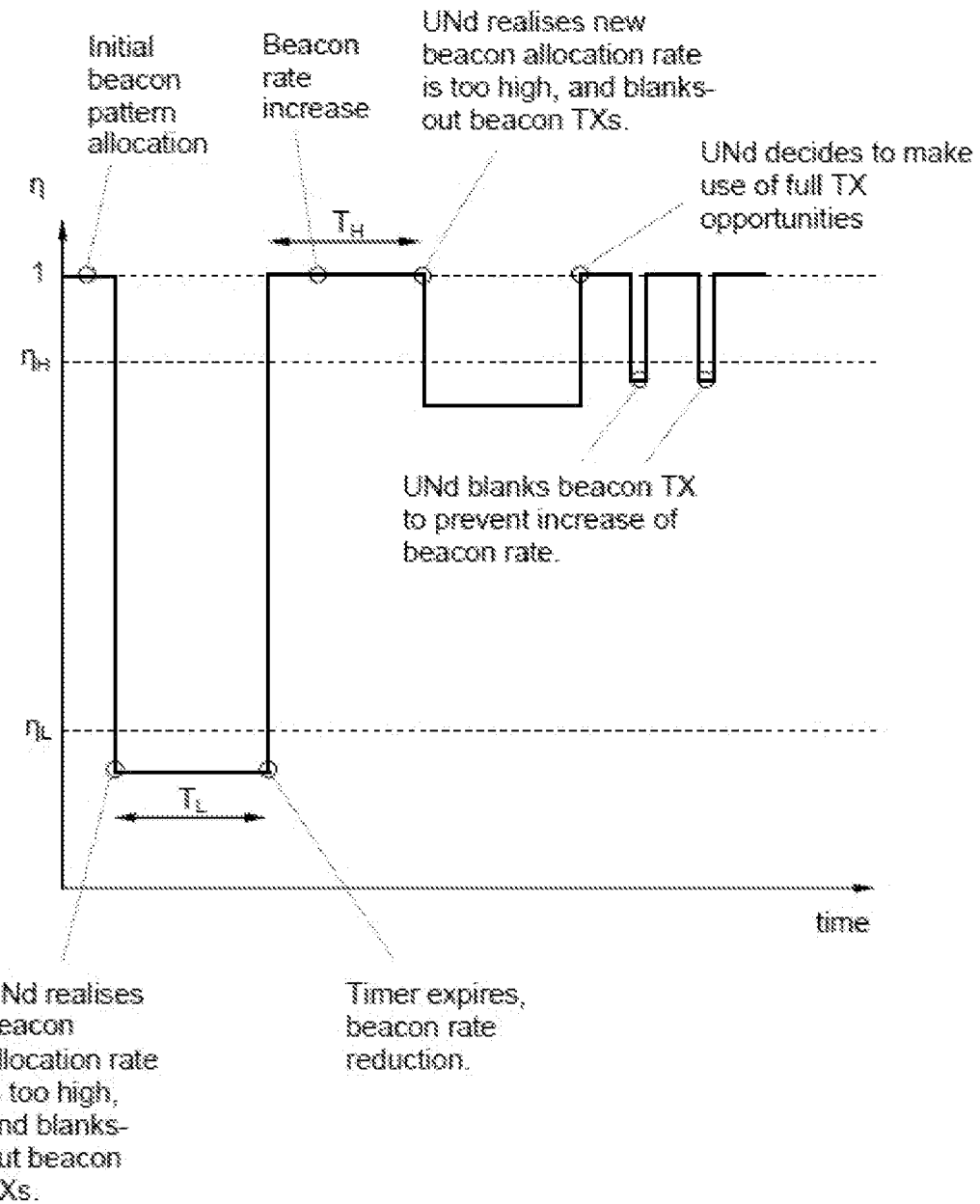
FIG. 10 illustrates an example of beacon resource utilisation over time in an embodiment.

FIG. 10 illustrates the possible evolution of the beacon resource utilisation and the effect of thresholds on beacon rate increase/decrease. The illustration is merely a non-limiting example of beacon resource utilisation over time (thresholds and timer values are not scaled in the figure). Resource utilisation exceeding the upper beacon utilisation threshold $\eta_H$ indicates beacon resource shortage. Beacon rate may be increased. Further, resource utilisation below the lower beacon utilisation threshold $\eta_L$ indicates beacon resource overprovisioning. Beacon rate may be reduced.

Figure 11:
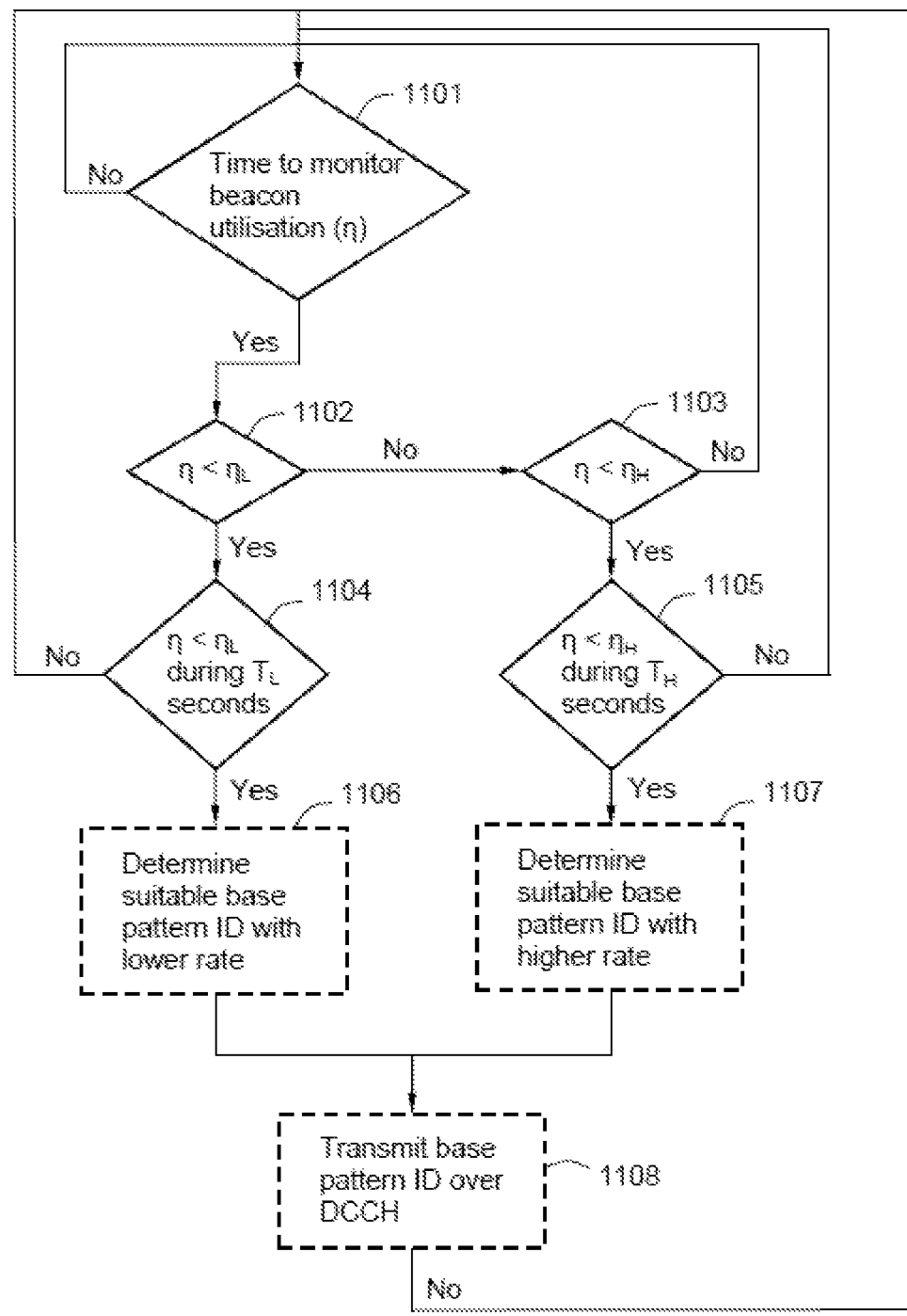
FIG. 11 is a flowchart for network determination of increased or decreased beacon rate allocation patterns in an embodiment.

FIG. 11 illustrates a flowchart for network determination of increased or decreased beacon rate allocation patterns according to a non-limiting embodiment.

In step 1101, it is determined if it is time to evaluate beacon rate adjustment, e.g. as a timer has timed out, or a validation time for a previously assigned beacon rate has ended.

In case it is, a check is made whether $\eta < \eta_L$ in step 1102. If so, a further check may be made if $\eta < \eta_L$ for a period of $T_L$ seconds in step 1104. If also this is true, a suitable base pattern ID with lower rate may be determined in step 1106.

Otherwise, a check may be made in step 1103 whether $\eta < \eta_H$. If so, a further check may be made if $\eta < \eta_H$ for a period of $T_H$ seconds in step 1105. If also this is true, a suitable base pattern ID with higher rate may be determined in step 1107.

In case a new beacon rate has been determined, the base pattern ID may be transmitted over DCCH in step 1108.

In another embodiment, decrease of beacon rate may be done implicitly as explained above (i.e. blanking out uplink beacon transmissions) whereas increase of beacon rate may be done explicitly over the UCCH. For this, a single bit field may be used indicating increase (bit=1) and no change (bit=0). In a more elaborated case, a multiple bit field may indicate if the increase should be more or less substantial, etc.

In another embodiment, the network side, i.e. the ANd 110 and/or the CNd 130 via the ANd 110, may inform the UNd 120 (over the DCCH) about the time duration that a beacon resource pattern allocation granted to the UNd 120 is valid, see an illustrated example in FIG. 12, wherein an identity reference of the UNd 120 is associated with a base pattern identity and a validation time, i.e. a time period during which the allocated beacon resource pattern is valid for the UNd 120.

At the expiry of the beacon resource pattern allocation validation time ($T_v$) the ANd 110 and/or the CNd 130 may decide to retain or reassign a new pattern to the UNd 120. This will enable the ANd 110 and/or the CNd 130 to enforce patterns to UNds 120 depending on the quality and the quality duration of the received uplink beacons.

Figure 13:
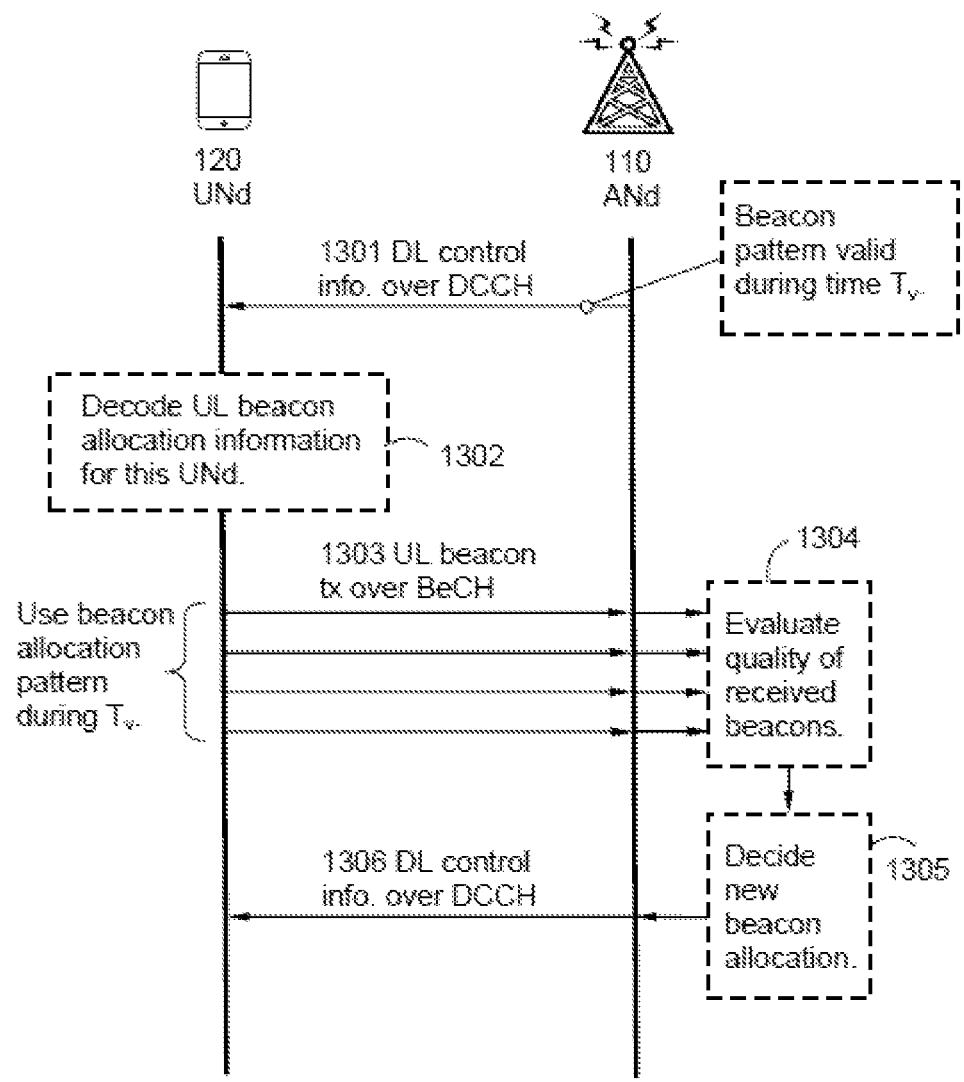
FIG. 13 illustrates a signalling scheme and a possible sequence flow according to an embodiment of the invention.
Figure 14:
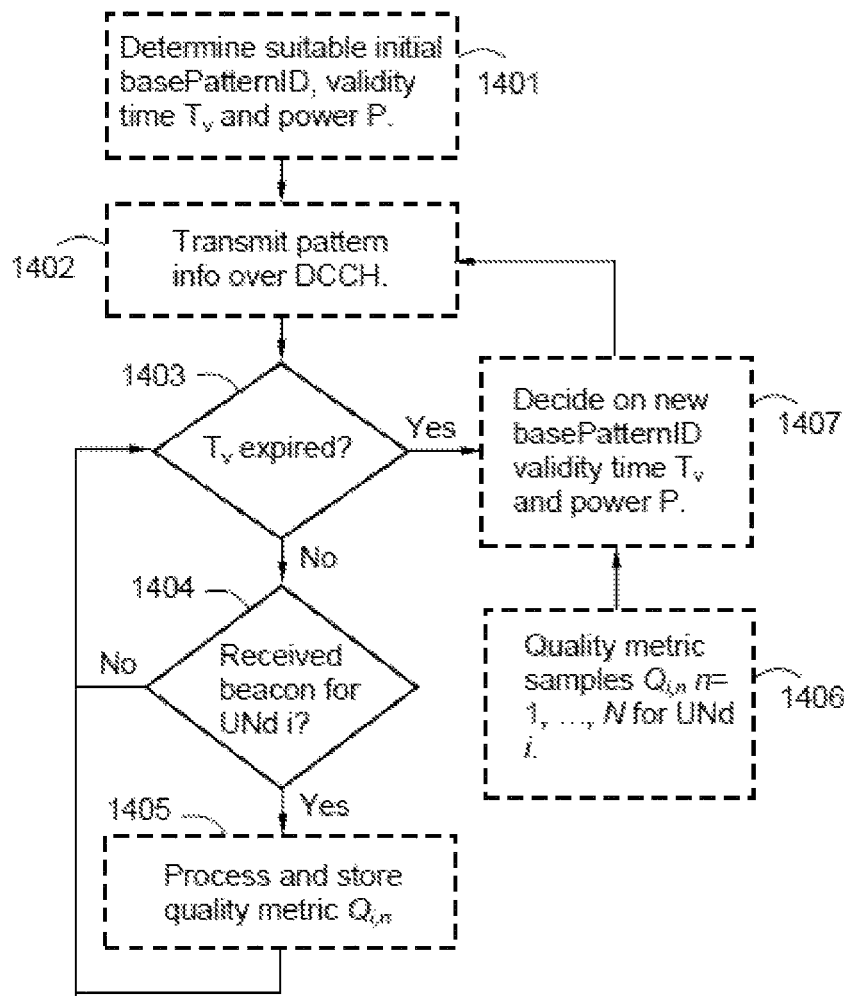
FIG. 14 illustrates a flow chart according to an embodiment.

FIG. 13 illustrates a signalling scheme wherein the CNd 130 informs the UNd 120 about the allocated beacon resource pattern and the validation time $T_v$, via the ANd 110 in step 1301. The UNd 120 decode the uplink beacon allocation information in step 1302. Uplink beacons of the UNd 120 as received by the ANd 110 are forwarded to the CNd 130 where information thereof is processed and relevant quality metrics are extracted. Based on these metrics a decision on whether to maintain, increase or decrease the current beacon allocation frequency is made, as illustrated in the CNd flow chart in FIG. 14.

The ANd 110 may receive uplink beacon signals in step 1303.

In a further embodiment the quality of the received beacons may be evaluated in step 1304 (either at one or multiple ANds 110), which may be used to determine the uplink beaconing pattern of the UNd 120 in step 1305. For example, if the received quality of the uplink beaconing of the UNd 120 is above a certain (maximum/high) threshold, QHth, value for certain period of time then the network may enforce the UNd 120 to perform less frequent uplink beaconing and possibly with lower transmit power. In another example, when the received quality of the beacons is below a certain (minimum/low) threshold, QLth, then the CNd 130 may enforce an uplink beacon resource pattern allocation with higher beaconing rate and probably higher transmit power if possible in step 1306.

One possible implementation according to some embodiments be the following: The CNd 130 may measure the quality metric $Q_i$ of the UNd 120 as the received signal strength from each beacon, being averaged over the frequency domain. Assume that during the time $T_v$, N such quality samples $Q_{i,n}$ are collected with n=1, ... N, where N is an arbitrary integer $1 \leq N \leq \infty$. The number of samples may be computed $N_L \in [Q_{min}, Q_{Lth})$, $N_H \in (Q_{Hth}, Q_{max}]$ and $N_M \in [Q_{Lth}, Q_{Hth}]$ such that $N_L + N_M + N_H = N$. Then, the decision may be based on comparing the normalised quantities $\overline{N}_L = N_L/N$, $\overline{N}_M = N_M/N$ and $\overline{N}_H = N_H/N$. If $\max(\overline{N}_L, \overline{N}_M, \overline{N}_H) = \overline{N}_L$, then a beacon resource pattern with higher rate, and possibly higher power, may be selected. If $\max(\overline{N}_L, \overline{N}_M, \overline{N}_H) = \overline{N}_H$ then a beacon resource pattern with lower rate, and possibly lower power, may be selected. Finally, if may $\max(\overline{N}_L, \overline{N}_M, \overline{N}_H) = \overline{N}_M$, then the beacon resource pattern may remain the same.

Alternatively, an estimation of the Signal to Interference plus Noise Ratio (SINR) may be made in some embodiments, instead of the received signal strength to capture the quality $Q_i$ of the received beacons. Instead of SINR, any similar measurement may be utilised such as e.g. Signal to Noise Ratio (SNR or S/N), Signal to Interference Ratio (SIR), Signal to Noise plus Interference Ratio (SNIR), Signal, Noise and Distortion ratio (SINAD), Signal-to-Quantization-Noise Ratio (SQNR), or any similar measurement or ratio related to a comparison of the power level of a desired signal with the level of undesired background noise.

The values of the above threshold entities may be within the interval $Q_{min} < Q_{Lth} \leq Q_{Hth} < Q_{max}$ and determined by the network (along with $Q_{min}$ and $Q_{max}$) based on current state and historical data. An advantage of this embodiment is that it gives the CNd 130 the flexibility to allocate uplink beaconing resources among the UNds 120 more effectively taking into account the quality of the UNd links.

The resource usage of beacon occasions may be determined based on the actual need, which reduces the number of transmissions compared to a static allocation, which reduces the battery consumption in the battery charged UNd 120. In addition, this limitation of beacon transmissions benefits the overall beacon capacity for other UNds which share the same beacon resources. In particular, at least some embodiment of the invention does not involve explicit signalling from the UNd 120 to the CNd 130, thus reducing the control overhead on the UCCH.

Thus the CNd 130 may determine suitable initial basePatternID, validity time $T_v$ and power P in step 1401. In a further step 1402, beacon pattern information is transmitted over DCCH. Further a check may be made if $T_v$ has expired in step 1403. In case it has, a new basePatternID validity time $T_v$ and power P may be decided in step 1407. Otherwise a check may be made if a beacon has been received for the UNd 120, in step 1404. If so, the quality metric is processed and stored in step 1405. Quality metric samples may be used to Decide on new basePatternID validity time $T_v$ and power P in step 1406.

Figure 15:
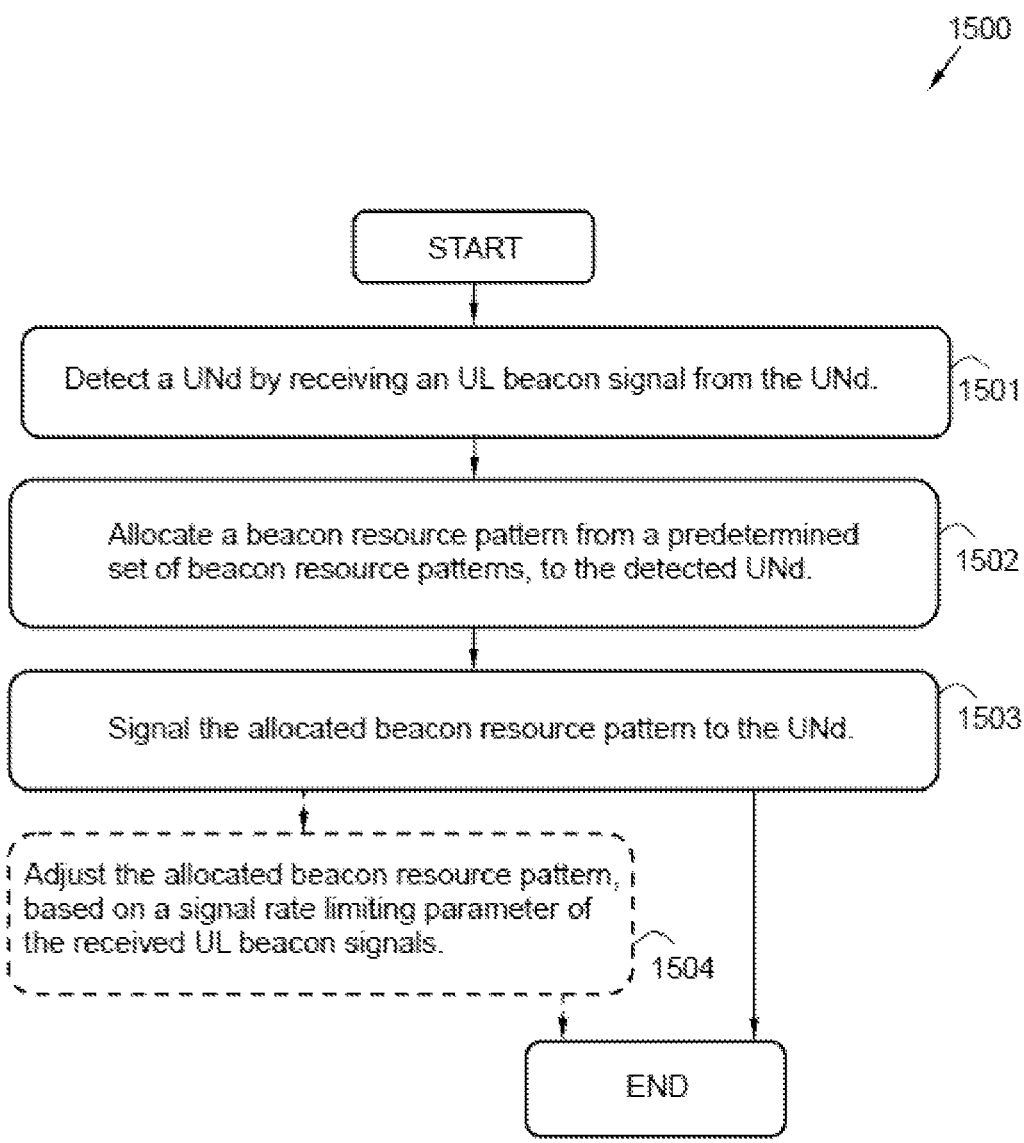
FIG. 15 is a flow chart illustrating a method in an access node according to an embodiment of the invention.

FIG. 15 illustrates embodiments of a method 1500 for use in an ANd 110. The method 1500 aims at allocating a beacon resource pattern to a UNd 120.

To appropriately allocate a beacon resource pattern to the UNd 120, the method 1500 may comprise a number of actions 1501-1504.

It is however to be noted that any, some or all of the described step 1501-1504, may be performed in a somewhat different chronological order than the enumeration indicates, be performed simultaneously or even be performed in a completely reversed order according to different embodiments. Some actions such as e.g. step 1504 may be performed within some, but not necessarily all embodiments. Further, it is to be noted that some steps may be performed in a plurality of alternative manners according to different embodiments, and that some such alternative manners may be performed only within some, but not necessarily all embodiments.

Any, some or all of step 1501-1504 may in some embodiments be periodically re-performed. The method 1500 may comprise the following actions:

Step 1501 comprises detecting the UNd 120 by receiving an uplink beacon signal from the UNd 120.

Step 1502 comprises allocating a beacon resource pattern from a predetermined set of beacon resource patterns, to the detected 1501 UNd 120.

In some embodiments, the beacon resource pattern with the highest beacon rate in the predetermined set of beacon resource patterns may be allocated initially to the detected 1501 UNd 120.

According to some embodiments, the beacon resource pattern is allocated to the detected 1501 UNd 120 during a predetermined validation time. Further the validation time of the allocated beacon resource pattern may be signalled to the UNd 120.

However, in some embodiments, a random beacon resource pattern may be allocated to the UNd 120. Alternatively, the first free beacon resource pattern in a list of beacon resource patterns may be allocated to the UNd 120.

Furthermore, according to some embodiments, also other information related to the allocated beacon resource pattern may be considered such as e.g. frequency, time and/or transmission power, and/or a combination thereof, of the uplink beacon signalling.

Step 1503 comprises signalling the allocated beacon resource pattern, and possibly also other thereby related information to the UNd 120.

Such information related to the allocated beacon resource pattern may comprise e.g. a reference or index to a predefined set of beacon resource allocation patterns; a value (an offset) indicating difference from a predefined beacon resource allocation pattern; a complete description of the allocated beacon resource pattern; signature consisting of a sequence of bits of positive length that indicates a key and an algorithm to generate the pattern; a key consisting of sequence of bits of positive length that can be used to generate the pattern, or similar information.

Such key may resemble to a pseudorandom key that is used to generate pseudorandom patterns. The advantage of this is that it allows an extension of the set of beacon resource patterns, for instance, for the case of high user load.

Furthermore, information concerning frequency, time and/or transmission power, and/or a combination thereof may be signalled to the UNd 120 in some embodiments.

In case the ANd 110 has adjusted the allocation of beacon resource pattern to the UNd 120, the adjusted beacon resource pattern, or information thereof, may be signalled to the UNd 120, in some embodiments.

Step 1504 may be performed only in some embodiments. Step 1504 comprises adjusting the allocated beacon resource pattern, based on a signal rate limiting parameter of the received uplink beacon signals; and wherein the signalled 1503 beacon resource pattern comprises the adjusted beacon resource pattern.

The signal rate limiting parameter may comprise at least one of rate or quality of the received uplink beacon signals in some embodiments.

The adjustment may comprise determining that beacon utilisation of the UNd 120 is lower than a threshold limit. Further the adjustment may comprise adjusting the allocated beacon resource pattern by allocating a beacon resource pattern with lower beaconing rate, than the currently allocated beacon resource pattern, to the UNd 120.

Furthermore the adjustment may comprise determining that beacon utilisation of the UNd 120 exceeds the threshold limit. In addition the adjustment may comprise adjusting the allocated beacon resource pattern by allocating a beacon resource pattern with higher beaconing rate, than the currently allocated beacon resource pattern, to the UNd 120.

Figure 16:
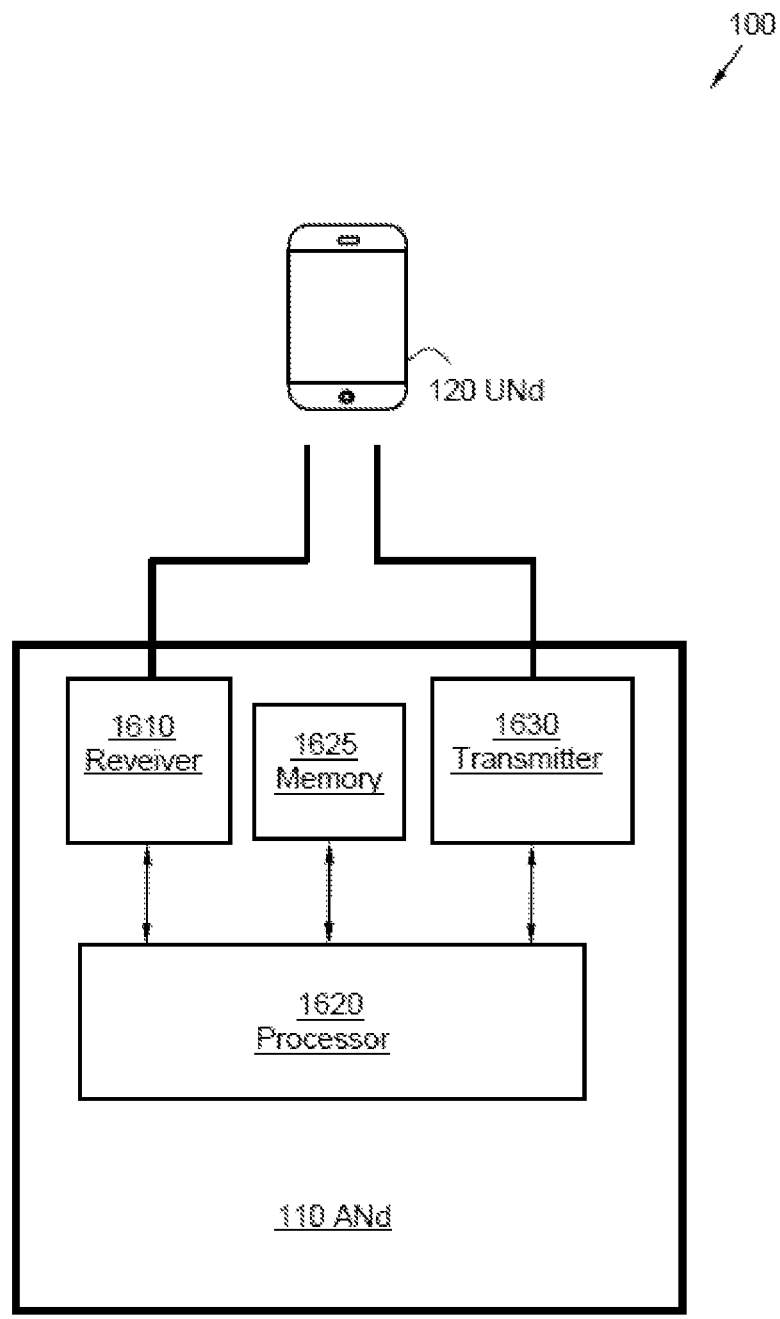
FIG. 16 is a block diagram illustrating an access node according to an embodiment of the invention.

FIG. 16 illustrates an embodiment of an ANd 110, configured for allocating a beacon resource pattern to a UNd 120. The ANd 110 is configured to detect the UNd 120 by receiving an uplink beacon signal from the UNd 120. Further the ANd 110 may be further configured to allocate a beacon resource pattern from a predetermined set of beacon resource patterns, to the detected UNd 120. Also, the ANd 110 may be further configured to signal information about the allocated beacon resource pattern to the UNd 120.

The ANd 110 is configured to perform the method 1500 according to any, some, all, or at least one of the enumerated actions 1501-1504, according to some embodiments.

For enhanced clarity, any internal electronics or other components of the ANd 110, not completely indispensable for understanding the herein described embodiments has been omitted from FIG. 16.

The ANd 110 may also be configured to allocate the beacon resource pattern with the highest possible beacon rate in the predetermined set of beacon resource patterns, to the detected UNd 120.

Furthermore, the ANd 110 may also be configured to adjust the allocated beacon resource pattern, based on a signal rate limiting parameter of the received uplink beacon signals. The ANd 110 may also be configured to signal information to the UNd 120, comprising the adjusted allocated beacon resource pattern.

The signal rate limiting parameter comprises at least one of rate, or quality, of the received uplink beacon signals.

The ANd 110 may also be configured to adjust the allocated beacon resource pattern by determine that beacon utilisation of the UNd 120 is lower than a threshold limit. Further the ANd 110 may be configured to adjust the allocated beacon resource pattern by adjusting the allocated beacon resource pattern by allocating a beacon resource pattern with lower beaconing rate, than the currently allocated beacon resource pattern, to the UNd 120, in some embodiments.

Additionally, the ANd 110 may also be configured to adjust the allocated beacon resource pattern by determining that beacon utilisation of the UNd 120 exceeds the threshold limit. The ANd 110 may then adjust the allocated beacon resource pattern by allocating a beacon resource pattern with higher beaconing rate, than the currently allocated beacon resource pattern, to the UNd 120.

Furthermore, the ANd 110 may also be configured, in some embodiments, to allocate the beacon resource pattern to the detected UNd 120 during a predetermined validation time. The ANd 110 may also be configured to signal information comprising at least the predetermined validation time of the allocated beacon resource pattern to the UNd 120.

The ANd 110 comprises a receiver 1610, configured to receive an uplink beacon signal from the UNd 120.

Further, the ANd 110 comprises a processor 1620, configured to detect the UNd 120 by the receiving an uplink beacon signal received from the UNd 120 via the receiver 1610. Further, the processor 1620 is configured to allocate a beacon resource pattern from a predetermined set of beacon resource patterns, to the detected UNd 120. The processor 1620 is also configured to generate control signals for signalling information about the allocated beacon resource pattern to the UNd 120 via a transmitter 1630.

The processor 1620 may also perform at least some of the previously described method steps 1501-1504 according to the method 1500 for allocating a beacon resource pattern to the UNd 120.

Such processor 1620 may comprise one or more instances of a processing circuit, i.e. a Central Processing Unit (CPU), a processing unit, a processing circuit, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

In further addition, the ANd 110 may comprise at least one memory 1625, according to some embodiments. The optional memory 1625 may comprise a physical device utilised to store data or programs, i.e., sequences of instructions, on a temporary or permanent basis. According to some embodiments, the memory 1625 may comprise integrated circuits comprising silicon-based transistors. Further, the memory 1625 may be volatile or non-volatile.

At least a sub-set of the previously described method steps 1501-1504 to be performed in the ANd 110 may be implemented through the one or more processors 1620 in the ANd 110, together with a computer program product for performing the functions of at least some of the method steps 1501-1504. Thus a computer program product, comprising instructions for performing the method steps 1501-1504 may allocate a beacon resource pattern to a UNd 120, when the computer program is loaded into the processor 1620 of the ANd 110.

Thereby a computer program product may comprise a computer readable storage medium storing program code thereon for use by the ANd 110, for allocating a beacon resource pattern to a UNd 120. The program code comprising instructions for executing the above described method 1500 may comprise detecting the UNd 120 by receiving an uplink beacon signal from the UNd 120. Further the program code may also comprise allocating a beacon resource pattern from a predetermined set of beacon resource patterns, to the detected UNd 120. In addition, the program code furthermore also may comprise signalling the allocated beacon resource pattern to the UNd 120.

The computer program product mentioned above may be provided for instance in the form of a data carrier carrying computer program code for performing at least some of the method steps 1501-1504 according to some embodiments when being loaded into the processor 1620. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the ANd 110 remotely, e.g., over an Internet or an intranet connection.

Figure 17:
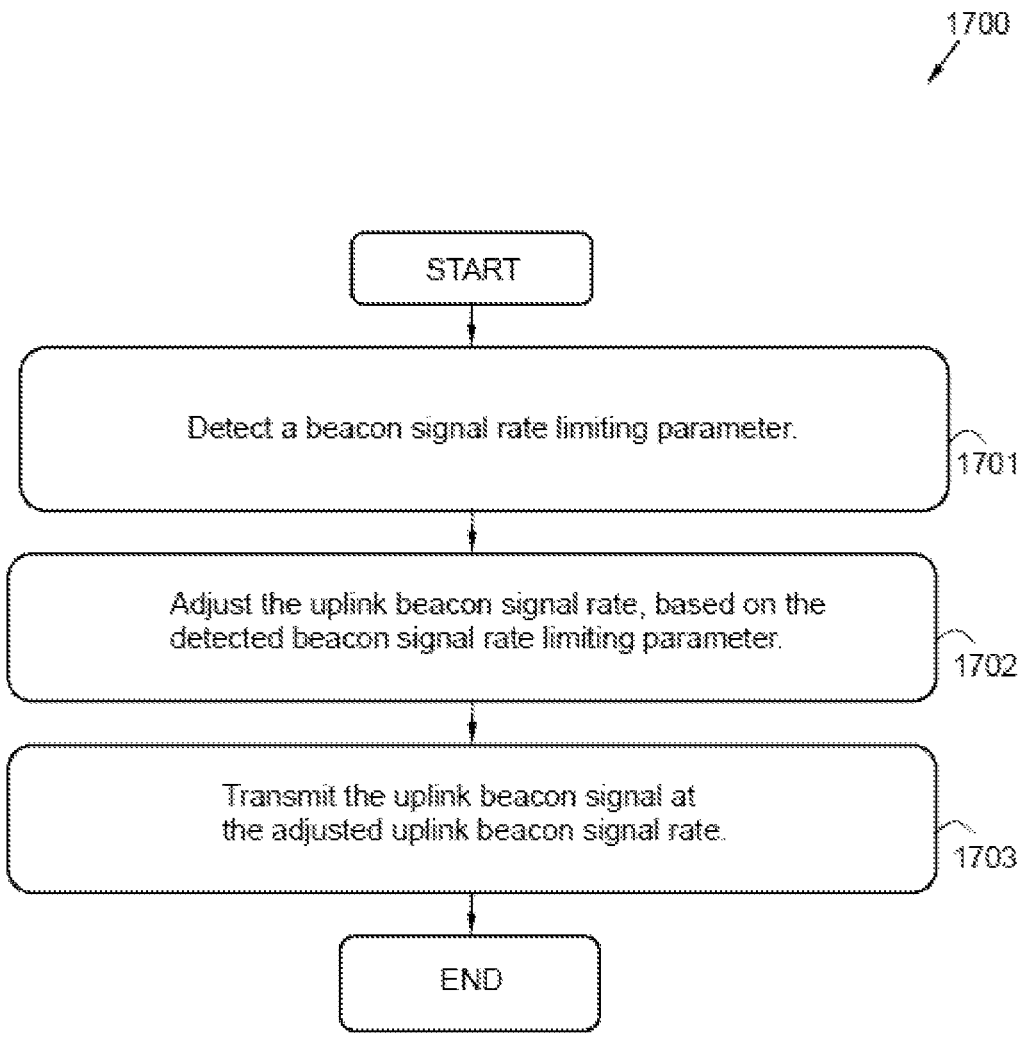
FIG. 17 is a flow chart illustrating a method in a user node according to an embodiment of the invention.

FIG. 17 illustrates embodiments of a method 1700 for use in a UNd 120. The method 1700 aims at transmitting an uplink beacon signal, to be received by at least one ANd 110 in a communication network 100. The UNd 120 is using a beacon resource pattern allocated by the ANd 110 with an uplink beacon signal rate on the allocated beacon resource pattern, or a subset thereof, when transmitting the uplink beacon signal.

To appropriately transmit the uplink beacon signal, the method 1700 may comprise a number of actions 1701-1703.

It is however to be noted that any, some or all of the described step 1701-1703, may be performed in a somewhat different chronological order than the enumeration indicates, be performed simultaneously or even be performed in a completely reversed order according to different embodiments. Further, it is to be noted that some steps may be performed in a plurality of alternative manners according to different embodiments, and that some such alternative manners may be performed only within some, but not necessarily all embodiments.

Any, some or all of step 1701-1703 may in some embodiments be periodically re-performed. The method 1700 may comprise the following actions:

Step 1701 comprises detecting a beacon signal rate limiting parameter.

The beacon signal rate limiting parameter may comprise e.g. speed of the UNd 120, or density of ANds 110 within a subset of the communication network 100, within wireless signalling reach of the UNd 120.

The beacon signal rate limiting parameter may be detected by estimating the UNd speed.

Further, in some embodiments, the beacon signal rate limiting parameter may be detected by estimating the density of ANds 110 within a subset of the communication network 100.

Step 1702 comprises adjusting the uplink beacon signal rate, based on the detected beacon signal rate limiting parameter.

Further, the uplink beacon signal rate adjustment may comprise decreasing the rate when the estimated UNd speed is lower than a threshold level, or increasing the rate when the estimated UNd speed exceeds the threshold level, within the allocated beacon resource pattern.

The uplink beacon signal rate adjustment may in some embodiments comprise decreasing the rate when the estimated density of ANds 110 is lower than a threshold level, or increasing the rate when the estimated density of ANds 110 exceeds the threshold level, within the allocated beacon resource pattern.

The beacon signal rate limiting parameter may in some embodiments be detected by receiving information thereof from the ANd 110.

Step 1703 comprises transmitting the uplink beacon signal at the adjusted 1702 uplink beacon signal rate.

Figure 18:
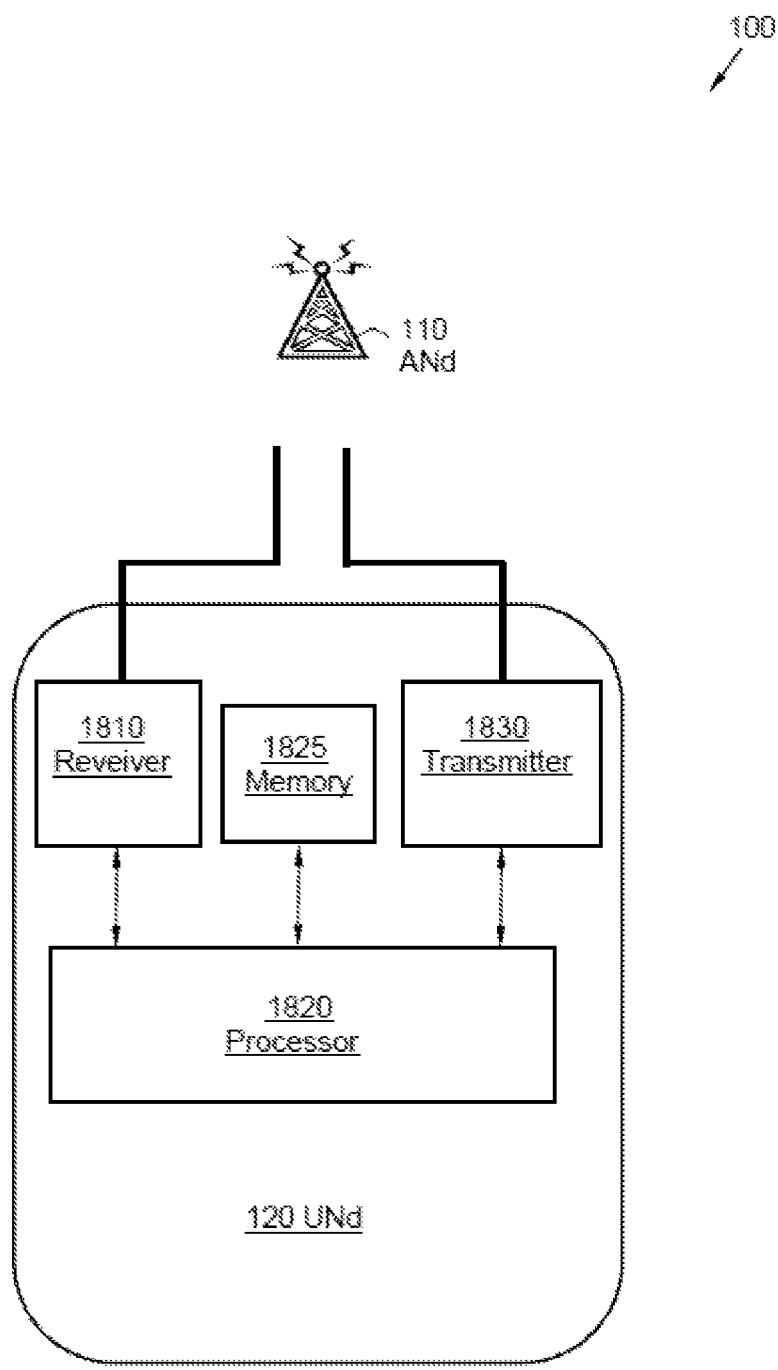
FIG. 18 is a block diagram illustrating a user node according to an embodiment of the invention.

FIG. 18 illustrates an embodiment of an UNd 120, configured to transmit at least one uplink beacon signal, to be received by at least one ANd 110 in a communication network 100. The uplink beacon signal is transmitted using a beacon resource pattern allocated by the ANd 110 with an uplink beacon signal rate.

The UNd 120 is also configured to detect a beacon signal rate limiting parameter. In addition the UNd 120 is further configured to adjust the uplink beacon signal rate, based on the detected beacon signal rate limiting parameter. Also, the UNd 120 is further configured to transmit the uplink beacon signal at the adjusted the uplink beacon signal rate.

The UNd 120 is thereby configured to perform the method 1700 according to any, some, all, or at least one of the enumerated actions 1701-1703, according to some embodiments.

For enhanced clarity, any internal electronics or other components of the UNd 120, not completely indispensable for understanding the herein described embodiments has been omitted from FIG. 18.

In different embodiments, the beacon signal rate limiting parameter comprises speed of the UNd 120 or density of ANds 110 within a subset of the communication network 100, within wireless signalling reach of the UNd 120.

The UNd 120 may also be configured to estimate the UNd speed. Furthermore, the UNd 120 may be configured to adjust the uplink beacon signal rate by decreasing the rate when the estimated UNd speed is lower than a threshold level, or increasing the rate when the estimated UNd speed exceeds the threshold level, within the allocated beacon resource pattern, in some embodiments.

The UNd 120 may also be configured to estimate the density of ANds 110 within a subset of the communication network 100. Further the UNd 120 may also be configured to adjust the uplink beacon signal rate by decreasing the rate when the estimated density of ANds 110 is lower than a threshold level, or increasing the rate when the estimated density of ANds 110 exceeds the threshold level, within the allocated beacon resource pattern.

Additionally the UNd 120 may also be configured to detect the beacon signal rate limiting parameter by receiving information thereof from the ANd 110.

The UNd 120 comprises a receiver 1810, configured to receive downlink signals transmitted by the ANd 110.

Further, the UNd 120 comprises a processor 1820, configured to detect a beacon signal rate limiting parameter. Further the processor 1820, configured to adjust the uplink beacon signal rate, based on the detected beacon signal rate limiting parameter. Furthermore, the processor 1820 is configured to generate control signals for transmitting the uplink beacon signal at the adjusted uplink beacon signal rate via a transmitter 1830.

The processor 1820 may also perform at least some of the previously described method steps 1701-1703 according to the method 1700 for transmitting an uplink beacon signal, to be received by at least one ANd 110 in a communication network 100.

Such processor 1820 may comprise one or more instances of a processing circuit, i.e. a Central Processing Unit (CPU), a processing unit, a processing circuit, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

In further addition, the UNd 120 may comprise at least one memory 1825, according to some embodiments. The optional memory 1825 may comprise a physical device utilised to store data or programs, i.e., sequences of instructions, on a temporary or permanent basis. According to some embodiments, the memory 1825 may comprise integrated circuits comprising silicon-based transistors. Further, the memory 1825 may be volatile or non-volatile.

At least a sub-set of the previously described method steps 1701-1703 to be performed in the UNd 120 may be implemented through the one or more processors 1820, together with a computer program product for performing the functions of at least some of the method steps 1701-1703. Thus a computer program product, comprising instructions for performing the method steps 1701-1703 may transmit an uplink beacon signal, when the computer program is loaded into the processor 1620 of the UNd 120.

Thereby a computer program product may comprise a computer readable storage medium storing program code thereon for use by the UNd 120, for adjusting and transmitting an uplink beacon signal. The program code comprising instructions for executing the above described method 1700 may comprise detecting a beacon signal rate limiting parameter. Further the program code may also comprise adjusting the uplink beacon signal rate, based on the detected beacon signal rate limiting parameter. In addition, the program code furthermore also may comprise transmitting the uplink beacon signal at the adjusted uplink beacon signal rate.

The computer program product mentioned above may be provided for instance in the form of a data carrier carrying computer program code for performing at least some of the method steps 1701-1703 according to some embodiments when being loaded into the processor 1820. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the UNd 120 remotely, e.g., over an Internet or an intranet connection.

The terminology used in the description of the embodiments as illustrated in the accompanying drawings is not intended to be limiting of the described methods 1500, 1700, ANd 110 and/or UNd 120. Various changes, substitutions and/or alterations may be made, without departing from the invention as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

Additionally, statements made herein characterizing the invention refer to an embodiment of the invention and not necessarily all embodiments.

What is claimed is:

1. An access node (ANd) for allocating a beacon resource pattern to a user node (UNd), wherein the ANd comprises:
    a receiver, configured to receive an uplink beacon signal from the UNd;
    a processor, configured to:
        detect the UNd based on receiving the uplink beacon signal from the UNd;
        allocate a beacon resource pattern, from a predetermined set of beacon resource patterns, to the detected UNd; and
        signal information about the allocated beacon resource pattern to the UNd;
    wherein the processor is further configured to:
        determine that beacon utilization of the UNd is lower than a threshold limit, wherein the beacon utilization corresponds to a ratio between a number of used beacon resources and a number of available resources of a currently allocated beacon resource pattern; and
        in response to determining that the beacon utilization of the UNd is lower than the threshold limit, allocate a beacon resource pattern with a lower beaconing rate than the currently allocated beacon resource pattern to the UNd.

2. The ANd according to claim 1, wherein the processor is further configured to:
    allocate the beacon resource pattern with the highest possible beacon rate in the predetermined set of beacon resource patterns to the detected UNd.

3. The ANd according to claim 1, wherein the processor is further configured to:
    adjust the allocated beacon resource pattern based on a signal rate limiting parameter of received uplink beacon signals; and
    signal information to the UNd comprising the adjusted allocated beacon resource pattern.

4. The ANd according to claim 3, wherein the signal rate limiting parameter comprises at least one rate or at least one quality of the received uplink beacon signals.

5. The ANd according to claim 1, wherein the processor is further configured to:

determine that a second beacon utilization of the UNd exceeds the threshold limit; and in response to determining that the second beacon utilization of the UNd exceeds the threshold limit, allocate a beacon resource pattern with a higher beaconing rate than a second currently allocated beacon resource pattern to the UNd.

6. The ANd according to claim 1, wherein the processor is further configured to:

allocate the beacon resource pattern to the detected UNd during a predetermined validation time; and signal information comprising at least the predetermined validation time of the allocated beacon resource pattern to the UNd.

7. A method for allocating a beacon resource pattern to a user node (UNd), wherein the method comprises:

detecting, by an access node (ANd), the UNd based on receiving an uplink beacon signal from the UNd;

allocating, by the ANd, a beacon resource pattern, from a predetermined set of beacon resource patterns, to the detected UNd; and signalling, by the ANd, the allocated beacon resource pattern to the UNd;

wherein the method further comprises:

determining, by the ANd, that beacon utilization of the UNd is lower than a threshold limit, wherein the beacon utilization corresponds to a ratio between a number of used beacon resources and a number of available resources of a currently allocated beacon resource pattern; and allocating, by the ANd, a beacon resource pattern with a lower beaconing rate than the currently allocated beacon resource pattern to the UNd.

8. The method according to claim 7, wherein allocating the beacon resource pattern to the detected UNd further comprises:

allocating the beacon resource pattern with the highest possible beacon rate in the predetermined set of beacon resource patterns to the detected UNd.

9. The method according to claim 7, further comprising:

adjusting the allocated beacon resource pattern based on a signal rate limiting parameter of received uplink beacon signals; and signalling information to the UNd comprising the adjusted allocated beacon resource pattern.

10. The method according to claim 9, wherein the signal rate limiting parameter comprises at least one rate or at least one quality of the received uplink beacon signals.

11. The method according to claim 7, further comprising:

determining that a second beacon utilization of the UNd exceeds the threshold limit; and in response to determining that the second beacon utilization of the UNd exceeds the threshold limit, allocating a beacon resource pattern with a higher beaconing rate than a second currently allocated beacon resource pattern to the UNd.

12. The method according to claim 7, wherein the beacon resource pattern is allocated to the detected UNd during a predetermined validation time; and wherein the method further comprises signalling information comprising at least the predetermined validation time of the allocated beacon resource pattern to the UNd.

13. A non-transitory computer-readable medium having processor-executable instructions stored thereon, wherein the processor-executable instructions, when executed, facilitate:

detecting a user node (UNd) based on receiving an uplink beacon signal from the UNd;

allocating a beacon resource pattern, from a predetermined set of beacon resource patterns, to the detected UNd; and signalling the allocated beacon resource pattern to the UNd;

wherein the processor-executable instructions, when executed, further facilitate:

determining that beacon utilization of the UNd is lower than a threshold limit, wherein the beacon utilization corresponds to a ratio between a number of used beacon resources and a number of available resources of a currently allocated beacon resource pattern; and allocating a beacon resource pattern with a lower beaconing rate than the currently allocated beacon resource pattern to the UNd.

14. The non-transitory computer-readable medium according to claim 13, wherein allocating the beacon resource pattern to the detected UNd further comprises:

allocating the beacon resource pattern with the highest possible beacon rate in the predetermined set of beacon resource patterns to the detected UNd.

15. The non-transitory computer-readable medium according to claim 13, wherein the processor-executable instructions, when executed, further facilitate:

adjusting the allocated beacon resource pattern based on a signal rate limiting parameter of received uplink beacon signals; and signalling information to the UNd comprising the adjusted allocated beacon resource pattern.

16. The non-transitory computer-readable medium according to claim 15, wherein the signal rate limiting parameter comprises at least one rate or at least one quality of the received uplink beacon signals.

17. The non-transitory computer-readable medium according to claim 13, wherein the processor-executable instructions, when executed, further facilitate:

determining that a second beacon utilization of the UNd exceeds the threshold limit; and in response to determining that the second beacon utilization of the UNd exceeds the threshold limit, allocating a beacon resource pattern with a higher beaconing rate than a second currently allocated beacon resource pattern to the UNd.

18. The non-transitory computer-readable medium according to claim 13, wherein the processor-executable instructions, when executed, further facilitate:

allocating the beacon resource pattern to the detected UNd during a predetermined validation time; and signalling information comprising at least the predetermined validation time of the allocated beacon resource pattern to the UNd.

* * * * *